(12) United States Patent
Steen et al.

(10) Patent No.: US 7,694,222 B2
(45) Date of Patent: Apr. 6, 2010

(54) DOCUMENT COMPOSITION SYSTEM AND METHOD

(76) Inventors: David A. Steen, 520 W. Simpson St., Mechanicsburg, PA (US) 17055; Jeannette E. Barnes, 520 W. Simpson St., Mechanicsburg, PA (US) 17055

( * ) Notice: Subject to any disclaimer, the term of this patent is extended or adjusted under 35 U.S.C. 154(b) by 986 days.

(21) Appl. No.: 10/904,993

(22) Filed: Dec. 8, 2004

(65) Prior Publication Data

US 2006/0123329 A1 Jun. 8, 2006

(51) Int. Cl.
G06F 15/00 (2006.01)
G06F 7/00 (2006.01)

(52) U.S. Cl. .................... 715/255; 715/234; 715/257; 715/266; 715/701; 707/100; 707/102

(58) Field of Classification Search .............. 715/500, 715/530, 533, 764, 200, 209, 255, 256, 257, 715/259, 273, 201, 205, 210, 226, 229, 231, 715/234, 254, 266, 271, 274, 700, 701, 731, 715/760, 762; 704/6, 9, 1–4, 100, 102, 104.1, 704/203, 205

See application file for complete search history.

(56) References Cited

U.S. PATENT DOCUMENTS

| | | | | |
|---|---|---|---|---|
| 5,738,523 A | * | 4/1998 | Wagoner et al. | 434/170 |
| 6,085,206 A | * | 7/2000 | Domini et al. | 715/257 |
| 6,272,508 B1 | * | 8/2001 | Dyne et al. | 715/210 |
| 7,120,642 B2 | * | 10/2006 | Hsu et al. | 707/102 |
| 2004/0250209 A1 | * | 12/2004 | Norcross et al. | 715/700 |
| 2004/0254927 A1 | * | 12/2004 | Lang et al. | 707/5 |
| 2005/0027576 A1 | * | 2/2005 | Klipstein | 705/8 |
| 2005/0069847 A1 | * | 3/2005 | Carter | 434/169 |
| 2005/0188322 A1 | * | 8/2005 | Napoleon | 715/760 |

OTHER PUBLICATIONS

"Guidelines for Dissertation and Thesis Writer", Georgetown University, The Graduate School of Arts & Sciences, Jul. 2002, pp. 1-20 and Appendix A.*
McNee et al., "On the Recommending of Citations for Research Papers," Computer Supported Cooperative Works, ACM, 2002, pp. 116-125.*
Shaw, "Writing Good Software Engineering Research Papers," IEEE, 2003, pp. 726-736.*
Linda B. Vanderworld "Target Editing," Second Edition, 1999.*

* cited by examiner

Primary Examiner—Laurie Ries
Assistant Examiner—Maikhanh Nguyen
(74) Attorney, Agent, or Firm—Axios Law; Adam L. K. Philipp

(57) ABSTRACT

A user-friendly technique is described for assisting users to compose original documents, such as essays, research papers, literary papers, historical papers, memoranda, and the like. Interactive software provides document-specific active assistance with creating, researching, writing, editing, and finalizing documents. Such assistance may take the form of providing document specific guides, automatically generating and inserting content, and/or checking for document specific errors.

12 Claims, 19 Drawing Sheets

DOCUMENT COMPOSITION SYSTEM AND METHOD

CROSS-REFERENCES TO RELATED APPLICATIONS

This application claims the benefit of U.S. Provisional Application No. 60/599,965, filed on Aug. 9, 2004, and entitled "PAPER WRITER'S GUIDE", with inventors David A. Steen and Jeannette E. Barnes, the entirety of which is hereby incorporated by reference.

FIELD

The present invention relates to the field of electronic data processing. More specifically, the present invention relates to methods and systems for composing documents.

BACKGROUND

Advances in microprocessor related technology have led to the widespread development and the adoption of computing devices. Computing powers that used to be available only in expensive mainframe computers requiring special operating environments are now available in many personal-computing devices. The form factors vary from desktop, laptop, palm-sized and so forth. A number of these computing devices are packaged as "special purpose" devices, such as set top boxes, entertainment personal digital assistants ("PDA"), pagers, text messengers, smart appliances and wireless mobile phones.

Concurrently, advances in networking, telecommunications and related technologies, in particular, in the area of wireless networking/communications, have led to increased connectivity between computing devices, over local, private, wide area, and/or public networks. Of particular notoriety is the Internet.

Together, these and other related factors contributed to the availability of rich content and functionality available from a variety of devices. Recently, this availability of connected devices has made significant advances in allowing communications and data retrieval over networks, such as the Internet from a variety of connected devices.

To facilitate the creation of rich content, applications and services have been implemented to allow document composition. However, these applications and services have been mainly limited to the creation of documents in which a user is interacting with a computer user interface without assistance from an application or service for composing a document.

BRIEF DESCRIPTION OF THE DRAWINGS

The present invention will be described by way of exemplary embodiments, but not limitations, illustrated in the accompanying drawings in which like references to note similar elements, and in which.

DETAILED DESCRIPTION

In the following description, reference is made to the accompanying drawings that form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Embodiments include a user-friendly technique for assisting users to compose original documents in the form of essays, research papers, literary papers, historical papers, memoranda and the like. Note that composing original documents is not so limited and may include the composition of other types of material as well. Embodiments may be practiced to engage in many forms of content composition using a device to assist a user with the composition of content.

In the following description, various aspects of selected embodiments will be described. However, it will be apparent to those of ordinary skill in the art and others that alternate embodiments may be practiced with only some or all of the aspects of the present invention. For purposes of explanation, specific numbers, materials and configurations are set forth in order to provide a thorough understanding of the present invention. However, it will be apparent to those of ordinary skill in the art and others that alternate embodiments may be practiced without the specific details. In other instances, well-known features are omitted or simplified in order not to obscure the illustrated embodiments.

Additionally, various operations will be described as multiple discrete steps, in a manner that is helpful to understanding of the present invention. However, the order of description should not be construed to imply that these operations are necessarily order dependent. In particular, these operations may not be performed in the order of presentation.

The phrase "in one embodiment" is used repeatedly. The phrase generally does not refer to the same embodiment, however, it may. The terms "comprising," "having" and "including" are synonymous, unless the context dictates otherwise.

Figure 1:
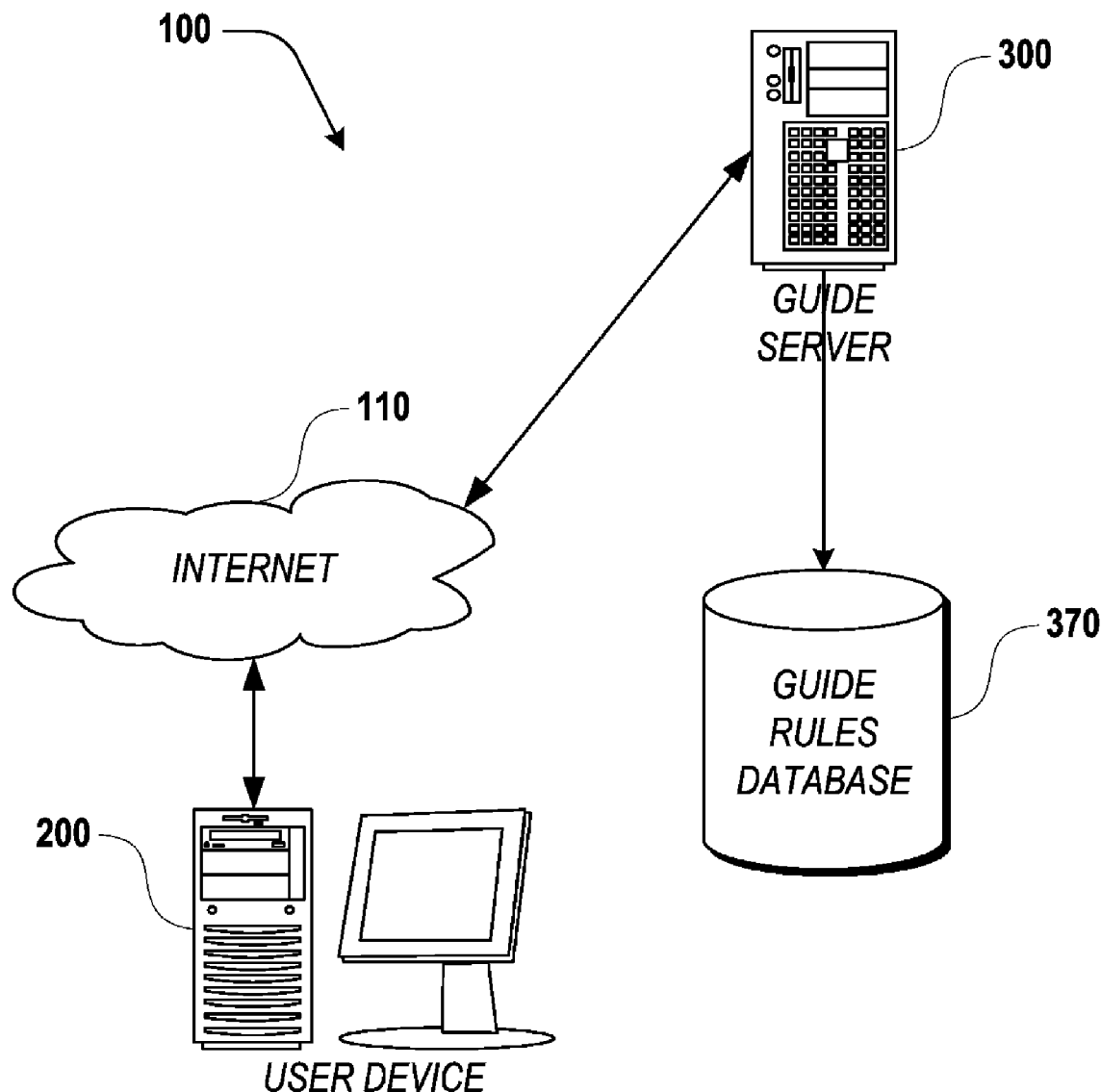
FIG. 1 illustrates a system view of an example operating environment, in accordance with one embodiment.

Referring now to FIG. 1, wherein an overview of an example operating environment, in accordance with one embodiment, is shown. The operating environment may also be considered and/or referred to as a system or a cluster of systems. As illustrated, example operating environment of a document composition system 100 includes a user device 200 and guide server 300 all interconnected via a network such as the Internet 110. Guide server 300, also includes a guide rules database 370 containing rule sets for various types of documents. In alternate embodiments, operating environment 100 may include more or less components. The devices of operating environment 100 may comprise a number of components.

Figure 2:
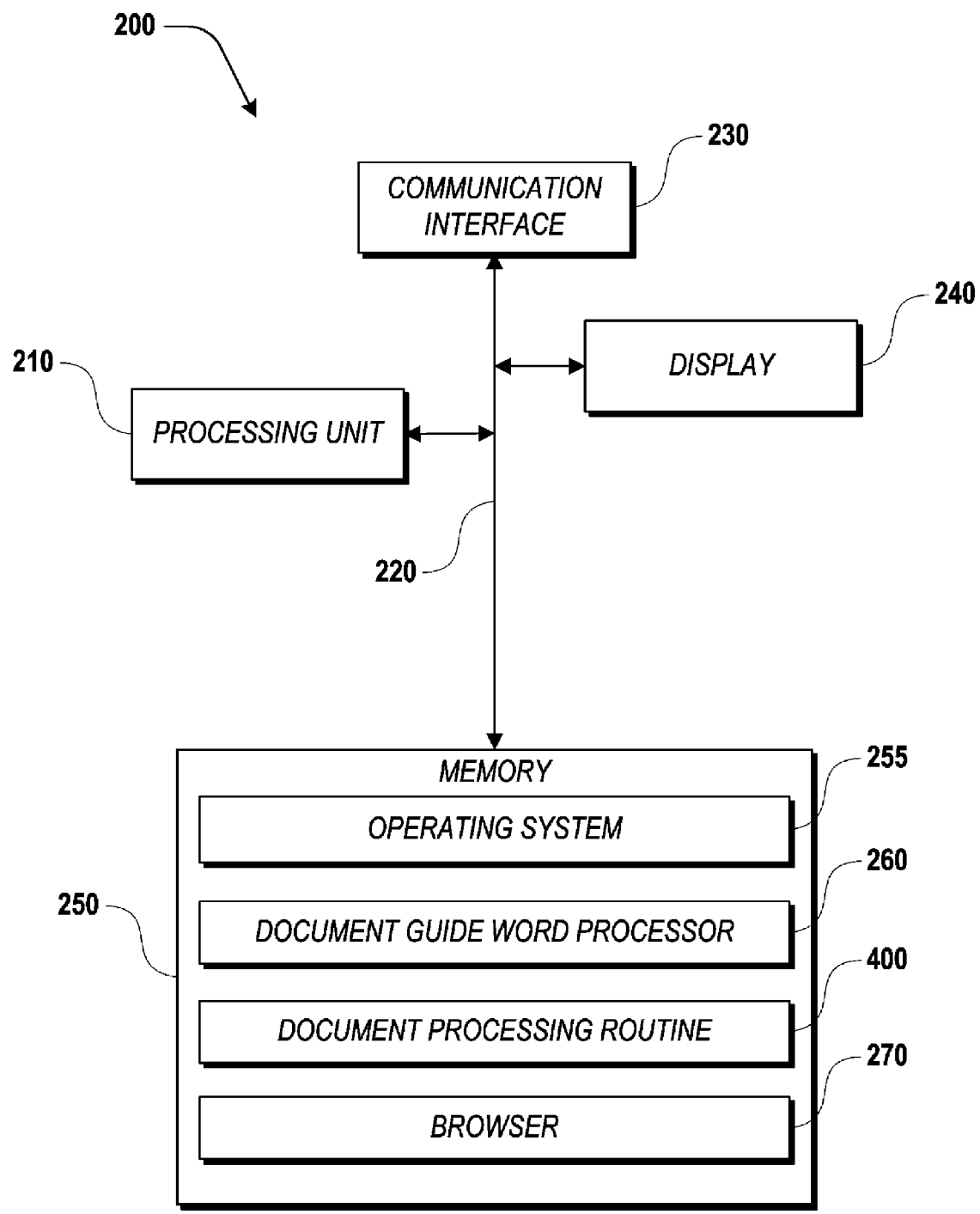
FIG. 2 illustrates an architectural view of a device suitable for use as a client device, in accordance with one embodiment.
Figure 3:
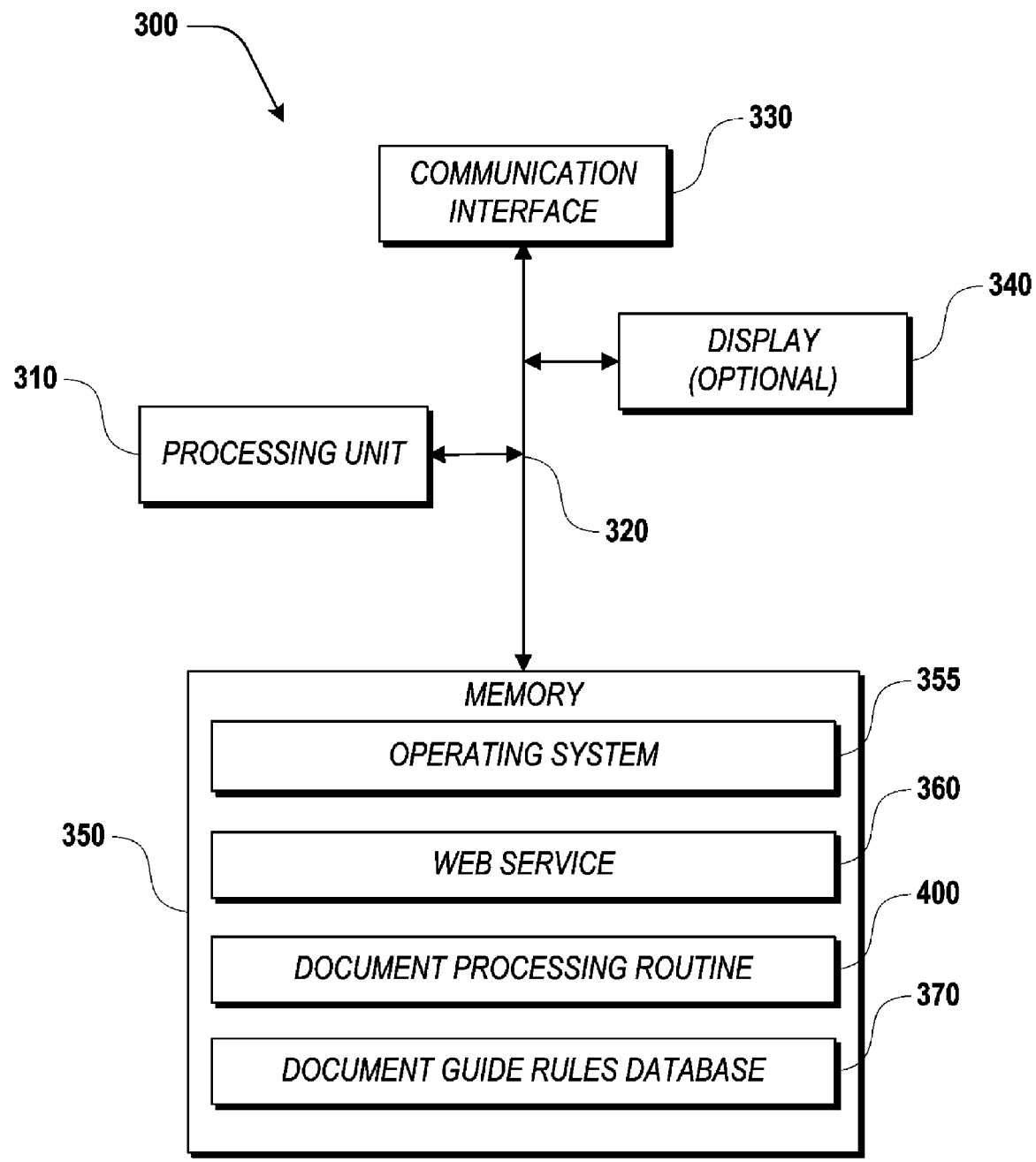
FIG. 3 illustrates an architectural view of a device suitable for use as a server device, in accordance with one embodiment.
Figure 4:
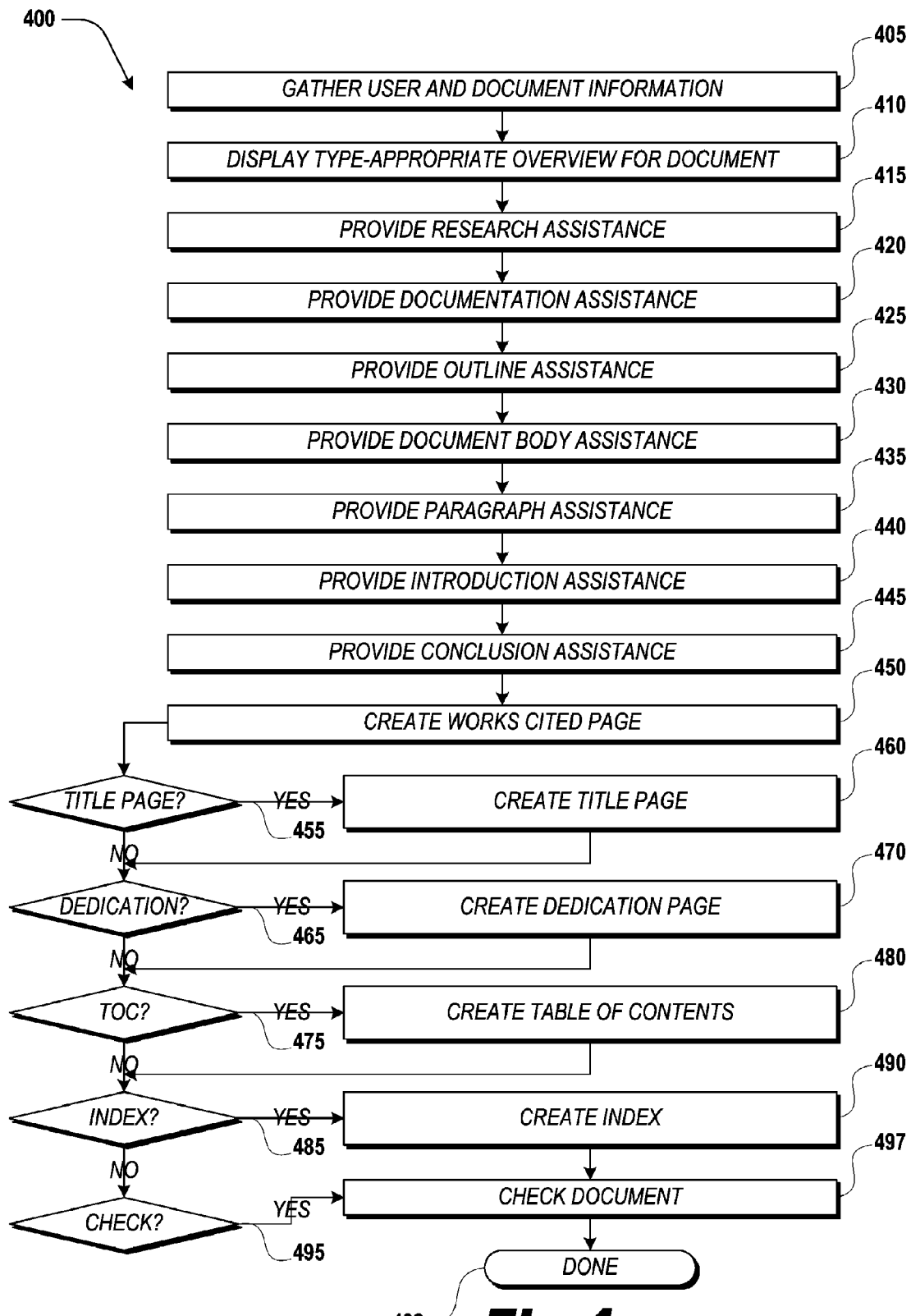
FIG. 4 illustrates the operational flow of relevant aspects of a process for composing a document, in accordance with one embodiment.
Figure 5:
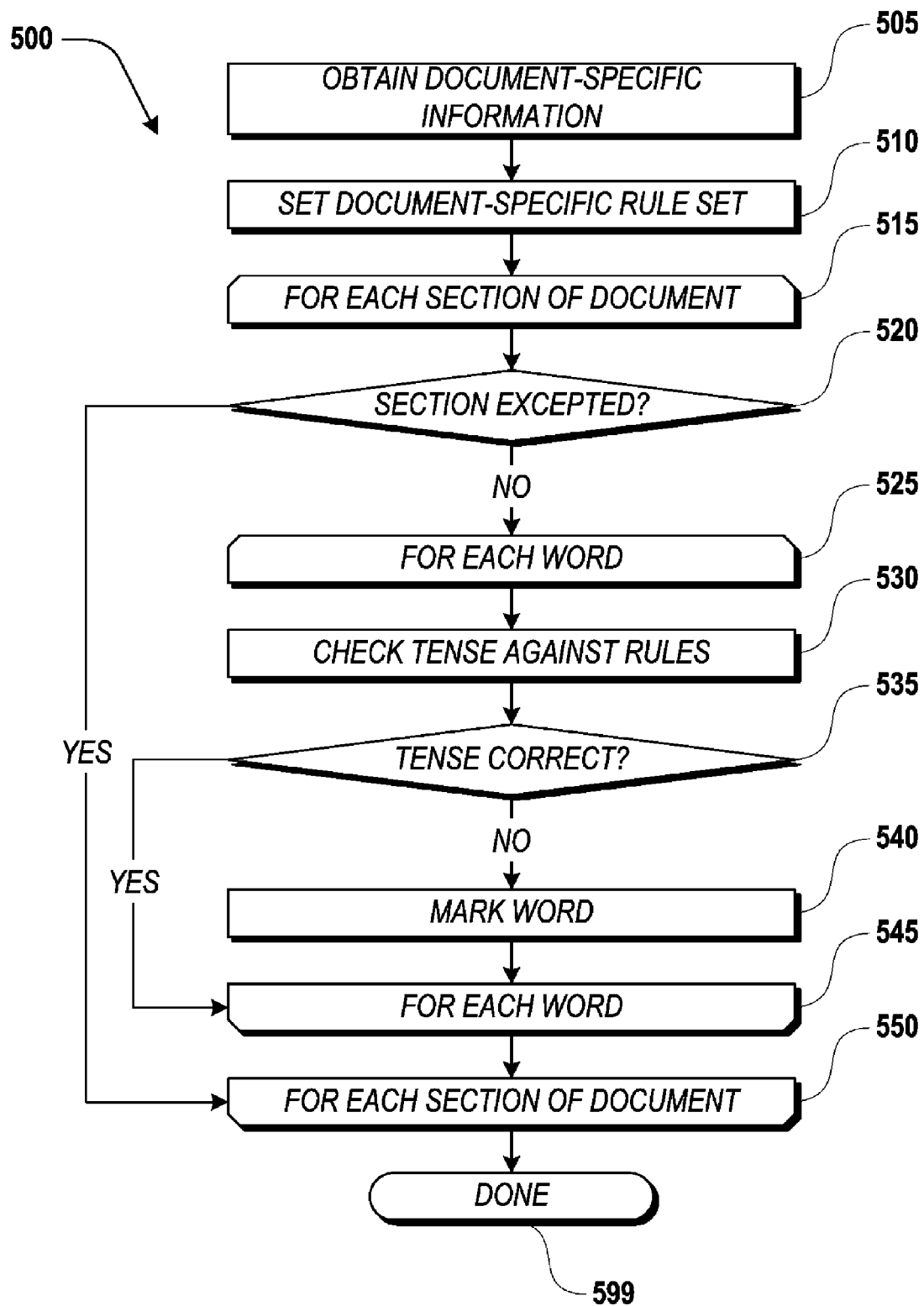
FIG. 5 illustrates the operational flow of relevant aspects of a process for tenses of words in a document, in accordance with one embodiment.

FIG. 2 illustrates one exemplary embodiment of a user device 200, which is described below. Similarly, FIG. 3 illustrates one exemplary embodiment of a guide server 300, which is described below. FIGS. 4-5 illustrate exemplary communication protocols and processes, for operating environment 100.

In various embodiments, the user device 200 and guide server 300, are coupled to each other wirelessly, i.e., they are members of a wireless network (not shown). In other embodiments, the user device 200 and guide server 300 are coupled to each other as members of a wire-based or mixed wireless and wire-based network (e.g., as in the Internet 110). Regardless of the manner the devices are coupled to each other, for various embodiments, user device 200 and guide server 300 are each equipped to operate in accordance with at least one communication transaction protocol. In various embodiments, user device 200 and guide server 300 may be wholly or partially integrated. Thus, the terms user device and guide server as used herein, for the purpose of this specification, including the claims, shall be interpreted with the meaning of an appropriately equipped device, operating in accordance with one or more of the user device 200 and guide server 300 roles.

FIG. 2 illustrates an exemplary user device 200 suitable for use in one embodiment. One non-limiting example of such a device is a personal computer, but many other forms of a user device may be employed by various embodiments. In alternate embodiments, the user device 200 may include many more components (or fewer) than those shown in FIG. 2. However, it is not necessary that all of these generally conventional computing components be shown in order to disclose an enabling embodiment for practicing the present invention. Furthermore, while user device 200 may be referred to as a computing device, in various embodiments it may be any form of device suitable for composing documents.

As shown in FIG. 2, the user device 200 includes a communications interface 230, which, in some embodiments, may be a Network Interface Controller ("NIC"). The inter-device communications of the communications interface 230 may be designed to support a local area network, wide area network, personal area network, telephone network, power line network, serial bus or wireless (e.g., Bluetooth, IEEE 802.11 or 802.16 and the like) connection. Such a communications interface 230 would also include the necessary circuitry, driver(s) and/or transceiver for such a connection and would be constructed for use with the appropriate transmission protocols for such connections.

The user device 200 also includes a processing unit 210, a display 240, a graphical input 225, an optional audio input 245, an optional user input interface 235 and a memory 250, all interconnected along with the communications interface 230 via a bus 220. The memory 250 generally comprises a random access memory ("RAM"), a read only memory ("ROM") and a permanent mass storage device, such as a disk drive, flash RAM or the like. The memory 250 stores an operating system 255, document guide word processor 260, document processing routine 400 and a browser 270 (e.g., a World Wide Web browser). In alternate embodiments, bus 220 may be a hierarchy of bridged buses. For ease of understanding, operating system 255, document guide word processor 260, document processing routine 400 and browser 270 are illustrated as separate software components, in alternate embodiments, they may be comprised of multiple software components, implemented in hardware, or may be subparts of one or more integrated software components.

In one embodiment, the document processing routine 400 is adapted to enhance the composition of documents. In various embodiments, a document may be any version of human-readable text and/or images that is susceptible to composition by a user of the user device 200. Exemplary, non-limiting examples of documents include essays, research papers, literary papers, historical papers, memoranda and the like.

While the document processing routine 400 is described as residing on the user device 200, in alternate embodiments, document processing routine 400 may optionally reside on other devices of the operating environment 100, such as the guide server 300, or other devices (not shown).

It will be appreciated that the software components of user device 200 may be loaded from a computer-readable medium into memory 250 of the user device 200 using a mechanism (not shown) associated with the computer-readable medium such as a floppy, tape, DVD (Digital Versatile Disk) drive, CD (Compact Disk) drive, flash RAM or communications interface 230. In various embodiments, the loading may be performed during the manufacturing of user device 200, or subsequently. In other embodiments, the software components may be downloaded from one or more networked servers.

In various embodiments, the communications interface 230 may facilitate the connection of remote devices to the user device 200; for example, devices for reading and/or writing in machine-readable media, digital cameras, printers and the like. Various user-input interfaces (not shown) may also be coupled to the user device 200, such as, for example, keyboards, keypads, touch-pads, mice and the like.

FIG. 3 illustrates an exemplary guide server 300 suitable for use in one embodiment. In alternate embodiments, the guide server 300 may include many more components (or fewer) than those shown in FIG. 3. However, it is not necessary that all of these generally conventional computing components be shown in order to disclose an enabling embodiment. As shown in FIG. 3, the guide server 300 includes a communications interface 330, which, in some embodiments, may be a NIC. The inter-device communications of the communications interface 330 may be designed to support a local area network, wide area network, personal area network, telephone network, power line network, serial bus or wireless connection. Such a communications interface 330 would also include the necessary circuitry, driver(s) and/or transceiver for such a connection and would be constructed for use with the appropriate transmission protocols for such connections.

The guide server 300 also includes a processing unit 310, an optional display 340 and a memory 350, all interconnected along with the communications interface 330 via a bus 320. The memory 350 generally comprises RAM, ROM and a permanent mass storage device, such as a disk drive, flash RAM or the like. The memory 350 stores an operating system 355, web service 360, document processing routine 400 and guide rules database 370.

In alternate embodiments, bus 320 may be a hierarchy of bridged buses. For ease of understanding, operating system 355, web service 360, document processing routine 400 and guide rules database 370 are illustrated as separate software components; in alternate embodiments, they may be comprised of multiple software components, implemented in hardware, or may be subparts of one or more integrated software components.

It will be appreciated that the software components may be loaded from a computer-readable medium into memory 350 of the guide server 300 using a mechanism (not shown) associated with the computer-readable medium such as a floppy, tape, DVD drive, CD drive, flash RAM or communications interface 330. In various embodiments, the loading may be performed during the manufacturing of guide server 300, or subsequently. In other embodiments, the software components may be downloaded from one or more networked servers.

In various embodiments, the communications interface 330 may facilitate the connection of remote devices to the guide server 300; for example, devices for reading and/or writing in machine-readable media, digital cameras, printers and the like. Various input mechanisms may also be coupled to the guide server 300, such as, for example, keyboards, keypads, touch-pads, mice and the like (not shown).

FIG. 4 illustrates a high-level overview of the document composition processing within the user device 200 (or guide server 300) in accordance with one embodiment. Document processing Routine 400 begins with Block 405 where user information (name, school, class and the like) and the document information (document type, lengths, rule sets and the like) are gathered. In Block 410, a type-specific overview is presented to the user. For example, for a literary paper, an exemplary type-appropriate overview may comprise the following:

> "All Literature papers must be written in the present tense, unless you are referring to something that happened earlier or later in the text than the point to which you are currently referring, or if the information appears in quote marks. This program will underline anything not in the present tense as you write the paper. It will also prompt you to select another tense when you perform your Spelling and Grammar check."

Next, in Block 415, research assistance is provided. In one exemplary embodiment, research assistance comprises a guide (or series of user interface components, such as wizard dialog boxes). An exemplary research guide is included as Appendix A.

Next, in Block 420, documentation assistance is provided. Note that different types of documents and different rule sets may have different documentation requirements. Accordingly, in one exemplary embodiment, the documentation assistance is document-type and rule set specific. Exemplary documentation assistance may comprise instructions as to what information should be gathered from each source using the research in composition of the document.

Accordingly, the above noted research guide may be supplemented with documentation assistance, such as that shown in Appendix B.

Similarly, in Block 420, outline assistance is provided. In one embodiment, outline assistance may take the form of instructions to the user on what information should be included to outline a document. For example, exemplary outline instructions may comprise:

MAKING THE OUTLINE

You must be able to link specific pieces of information to your idea. You start with a general idea, but you need quotes and sources to support that information. In addition, you must decide how to link your ideas in the outline. These ideas are just as good for devising your outline as for coming up with ways to explain your ideas.

(1) Cover the history of your topic and what it means to the present (2) Examine the background of a writer and how it affected his or her literature.

(3) Fit your idea into a bigger literary/historical/sociological sense (4) The logical approach—each idea must lead to the next conclusion (5) Criticize the critics. Find out what the experts say and analyze it.

By now, you should have all the information that you need to write the paper. The key to success is to make sure that your information is organized correctly. The best way to organize is to come up with a rough outline. Look through your information. With the information, you know exactly what you can prove. Now, you just have to present it in a way that the instructor will like.

Think of the major points that you want to get across. For most papers, you should have no more than one or two major points per page. For example, a six-page paper should have somewhere between six and twelve major points. List the points that you want to make.

Look at the points and figure out the order in which you want to make them. Write them down in that order and number them with Roman numerals, leaving several spaces between each line. The first Roman numeral should be your introduction and the last should be your conclusion. You may type this information into the computer or write it down on a piece of paper. Now, put any supporting information underneath the major point that it fits best with. These can be labeled with letters.

Now you know the form that your paper is to take. If you have not done so already, type the outline into the computer.

If you are doing things the old-fashioned way, all of your quotes will be written down on pieces of paper under the author and title headings. Now, you will be making a series of decisions. You must decide under which heading each piece of information belongs. With the outline in front of you, put a Roman numeral next to each piece of information, assigning it to a spot on the outline. Now, it is time for the paper to write itself.

If you have typed the quotes and information into the computer already, you will have to cut and paste the information into your outline. If you have written the information on pieces of paper, you will simply type them into the outline at the appropriate place.

This is really the simplicity of the system. Once the quotes are in the computer in the order in which they will appear, the only thing you have to do is connect the quotes. The connection of quotes is in a standardized format to make everything as easy as possible.

Likewise, processing proceeds in Block 430 to provide document body assistance. Document body assistance may come in many forms, but while a user is composing a document in one embodiment, exemplary document body instructions may comprise:

Hook all of the quotes together in the outline you have laid out using this FORMAT:

(1) Introduce the quote (2) Give the quote (3) Explain the quote and how it relates to your thesis/main ideas (4) Transition to the next idea Remember: Take nothing for granted. Never assume the reader knows anything. Answer the questions:

(1) Why is this piece of information important?

(2) How does it relate to your thesis statement?

(3) Is there a chronological order that you should point out?

(4) Does this idea relate to anything else?

While composing the document body, processing may also proceed to Block 435 where paragraph specific assistance is provided.

Each type of document and rule set may have different preferred paragraph structures and/or styles. However, in one embodiment, the paragraph assistance may comprise the following instructions:

> Look at the quote or information you want to write about. You need to introduce this information. What is the main point that you are trying to make about this piece of information? After adding the main point: do any other quotes or pieces of information need to be put into this paragraph?

Next, in Block 440, introduction assistance is provided. Introductions may also vary depending on document types and rule sets, but in one exemplary embodiment, general instructions on document introductions may suffice. Accordingly, an example of introduction assistance may comprise:

> The last step in the actual writing process is to write the introduction and conclusion. This is the most difficult part because it will be the first and last thing that the grader will see. Therefore, you want to start and end well.
>
> There are several basic formats for the introduction. The most popular is the
>
> Inverted Pyramid.
>
> (1) Make a global statement that is really huge. This is not your main point; it is a general truth.
>
> (2) Narrow the statement down until you reach your main thesis. This is something that can be proven in a short paper rather than a book.
>
> Other Introductions
>
> Some instructors will prefer if you place all of your main points in the introduction. Similarly, the thesis statement will be either the first or the last sentence of the introduction.

In Block 445, conclusion assistance is provided to a user. Conclusion assistance may be provided in a number of forms (see for example FIG. 10), including general instructions on composition of conclusions for documents. For example:

> This is a tricky part of the paper. Each teacher tends to expect something different from the conclusion. However, there are tried-and-true basic formats.
>
> (1) Tell them what you already told them in the paper. Some teachers expect you to make your points as you go through the paper. At the end, the instructor simply wants a restatement of your major points. It will then be expected that either the first or the last sentence of the conclusion will be your thesis statement.
>
> (2) "Open up" your thesis. Restate your thesis and then discuss the implications of your thesis. Expand the idea into other areas and give the reader something more to think about. In other words, tell the reader what it all means and what other conclusions it might lead to.
>
> Say what you think. If the instructor specifically requests it, put your opinion into the paper. This is one of the rare times that it is good to use the word "I."

In Block 450, the user is presented with instructions (or a form, not shown) for composing a Works Cited page. As citations are often rule set specific (and possibly document type-specific), the contextually relevant instructions and/or form may also be rule set and/or document type-specific. For example, under the MLA rule set, instructions for Works Cited page citations may comprise:

> The format of the "Works Cited" page is to comport with the following formats:
>
> The words "Works Cited" are to be centered on the top of the page.
>
> The words "Works Cited" and all other words on the page are to be in Times New Roman 12-point font with one inch margins and without bold, all caps, quotation marks, or underlining.
>
> There is a double space between the title of the page and the first citation.
>
> All citations are in alphabetical order, according to the first letter of each citation.
>
> The page is double spaced.
>
> Double spacing between citations
>
> Double spacing within citations
>
> Citations that run longer than one line have the second and any further lines indented five spaces
>
> The citation page has a page number.
>
> Specific Format for Each Cite in the Works Cited Page:
>
> Book: [Author's last name, Author's first name Author's middle initial. Title of Book. City of Publication: Publisher, Year of Publication.]
>
> B. Book with two authors: [First author's last name, First author's first name First Author's middle initial, Second author's first name Second authors last name Title of Book. City of Publication: Publisher, Year of Publication.]
>
> Book with more than two authors: [First author's last name, First author's first name, First author's middle initial, et al. Title of Book. City of Publication: Publisher, Year of Publication.]
>
> Book with no author: [Title of Book. City of Publication: Publisher, Year of Publication.]
>
> Anthology or Compilation
>
> (1) The anthology itself: [Editor's last name, Editor's first name Editor's middle initial, Ed. Title of Anthology. City of Publication: Publisher, Year of Publication.]
>
> (2) A work within the anthology: [Article author's last name, article author's first name Article author's middle initial. "Title of Article." Title of Anthology. Ed. Editor's first name editor's last name. City of publication: Publisher, Year of publication. Page numbers.]
>
> Article from a professional or scholarly journal: [Author's last name, Author's first name Author's middle initial. "Title of Article." Title of Publication. Edition or issue (Year of Publication): page numbers.]
>
> Article from a magazine: [Author's last name, Author's first name Author's middle initial. "Title of Article." Title of Magazine. Day Month Year: Page numbers.]
>
> Newspaper article: [Author's last name, Author's first name Author's middle initial. "Title of Article." Name of Newspaper. Day Month Year, edition ed., Section number: Page Numbers]
>
> Reference Book Article: ["Title of Article." Title of Reference Book. Number of the edition (th ed.) Year of Publication.]
>
> Internet source
>
> (1) With author and article title: [Author's last name, Author's first name author's middle initial. "Title of Site." Year of Publication. Publisher. Day Month Year accessed <http://www.internetaddress>.]
>
> (2) With only author: [Author's last name, Author's first name and Author's middle initial. Year of Publication. Publisher. Day Month Year accessed <http://www.internetaddress>.]
>
> (3) With only title: ["Title of Site." Year of publication. Publisher. Day Month Year accessed <http://www.internetaddress>.]
>
> (4) With only Internet address: [<http://www.internetaddress>. Year of Publication. Publisher. Day Month Year accessed]

Next, processing proceeds the decision Block 455 where a determination is made whether a title page is desired. Such a determination may be made in view of user specific instructions and/or other information, such as class and/or instructor preferences that have been previously identified. If a title page is desired (or required), then processing proceeds to Block 460, otherwise processing proceeds to decision Block 465. In Block 460 the user is assisted in composing a title page. For example:

A dialog box may appear, stating that a title page is no longer necessary in the MLA format, but that the program can construct one. If the user selects "Yes, I want a title page," the following questions may be presented in a text box: Title of document, instructor's name, class title, writer's name, date due. The format for the title page may be as follows:
(1) Double Spacing
(2) Page centered
(3) Times New Roman 12 point font
(4) Title of Document
(5) Instructor's Name
(6) Class Title
(7) Writer's Name
(8) Date Due If the writer selects "No, I do not want a title page," the user may still be asked for the title of the document. This information may appear in the top left corner of the first page in one of the two following formats, in accordance with the selection made at the beginning of the program:
(1) Double Spaced
(2) Times New Roman 12 point font
(3) Title of Document
(4) Instructor's Name
(5) Title of Class
(6) User's Name
(7) Date Due
OR
(1) User's Name
(2) Instructor's name
(3) Course number
(4) Date The user may be allowed to override these selections if so required by his or her instructor or by the format appropriate to the type of document.

Next, in decision Block 465 a determination is made whether to compose a dedication page (e.g., from previously supplied information or as specified by a user). If so, processing proceeds to Block 470, otherwise processing proceeds to decision Block 475. In Block 470, a dedication page is composed. Example instructions for composing a dedication page may comprise:

The format of the dedication page is:
"This paper is dedicated to . . . "

These first five words are followed by any information the user wishes to enter. This page may directly follow a title page and have no page number or header.

Next, in decision Block 475, a determination is made whether a table of contents ("TOC") is desired. In some document types and/or rule sets, a TOC is required. However, in other situations a user may specify whether a TOC is desired/required. Additionally, some word processors have integrated TOC creation capabilities. Accordingly, in some embodiments processing may integrate with and/or supplement a word processor's TOC creation capabilities.

Similarly, decision Block 485 determines whether an index is desired. In some document types and/or rule sets, an index is required; while in other documents a user may specify whether an index is desired. Furthermore, some word processors have index creation capabilities. Therefore, in some embodiments processing may integrate with and/or supplement a word processor's index creation capabilities. Processing proceeds to decision Block 495 where a determination is made whether to check the document. If not, processing proceeds to Block 499. If so, processing proceeds to block 497 where the document is checked (e.g., grammar checking, spell checking, diction usage checking, tense checking and/or the like). Document processing Routine 400 then ends at Block 499.

In various embodiments, paper processing Routine 400 may include both conventional document checking (e.g., conventional word processor spelling and grammar checking) as well as specialized document checking. For example, diction checking for commonly mistaken words as well as other types of specialized document checking. Accordingly, an exemplary list of commonly misused words with definitions is included in Appendix F below as exemplary words used in diction checking. In at least one embodiment, document words are compared with the words in Appendix F and matching words are presented to a user for confirmation of their usage.

Diction may be document type and rule set independent. However, other forms of specialized document checking maybe document type and/or rule set specific. For example, a historical research paper should only use specific tenses of words throughout the paper (unless used in a quoted section of the paper).

Accordingly, FIG. 5 illustrates an exemplary tense checking Routine 500 in which the tenses of words are checked throughout the document in a (contextually relevant) document type and rule set specific manner. Tense checking Routine 500 begins at Block 505 where document specific information is obtained (e.g., type of document, etc.). In Block 510, a rule set is set for the document. Rule sets maybe automatically set according to other document information (e.g., a document type), maybe set by a user or maybe predetermined (e.g., as a default setting). Once document specific information and rule set have been determined, processing proceeds to looping Block 515 where, for each section, (each quoted or unquoted portion of a historical document) of the document, a loop is iterated through. Sections are those portions within the document where tense checking rules may change. For example, in an essay, the sections maybe single sentences and each sentence should have consistent tense usage. In other documents, the sections may be paragraphs, or in the example of historical research paper, quoted and unquoted sections. In still other embodiments, a document may have only a single section.

Within the section loop, processing proceeds to decision Block 520 where a determination is made whether the current section is exempt from tense checking (e.g., is within a quote, is part of a dialog or the like). If so, processing proceeds to looping Block 550, otherwise processing proceeds to looping Block 525. Looping Block 525 iterates through each word of the current section. In the word loop, processing proceeds to Block 530 where the tense of a current word is checked against the rule set (e.g., is it consistent with other words in the sentence/section, is it past tense, etc). In decision Block 535 a determination is made whether the tense of the current word is correct. If so, processing proceeds to looping Block 545, otherwise processing proceeds to Block 540. In Block 540 the word whose tense is wrong is marked (e.g., colored, underlined, highlighted, indicated in a dialog box or other user interface element, or the like). Processing proceeds the looping Block 545, which cycles back to the looping Block

525 until all words in a section have been iterated through. Next, in looping Block 550 processing cycles back to looping Block 515 until all sections of a document have been iterated through. Processing then proceeds to Block 599 where the tense checking Routine 500 ends.

The processes described above and shown in FIGS. 4-5 are merely exemplary sets of action within a guided document composition system. Other action, both more and fewer, may be employed in various embodiments. In accordance with the above description and the processes shown in FIG. 4-5, FIGS. 6-12 illustrate word processor interfaces for performing guided document composition.

Figure 6:
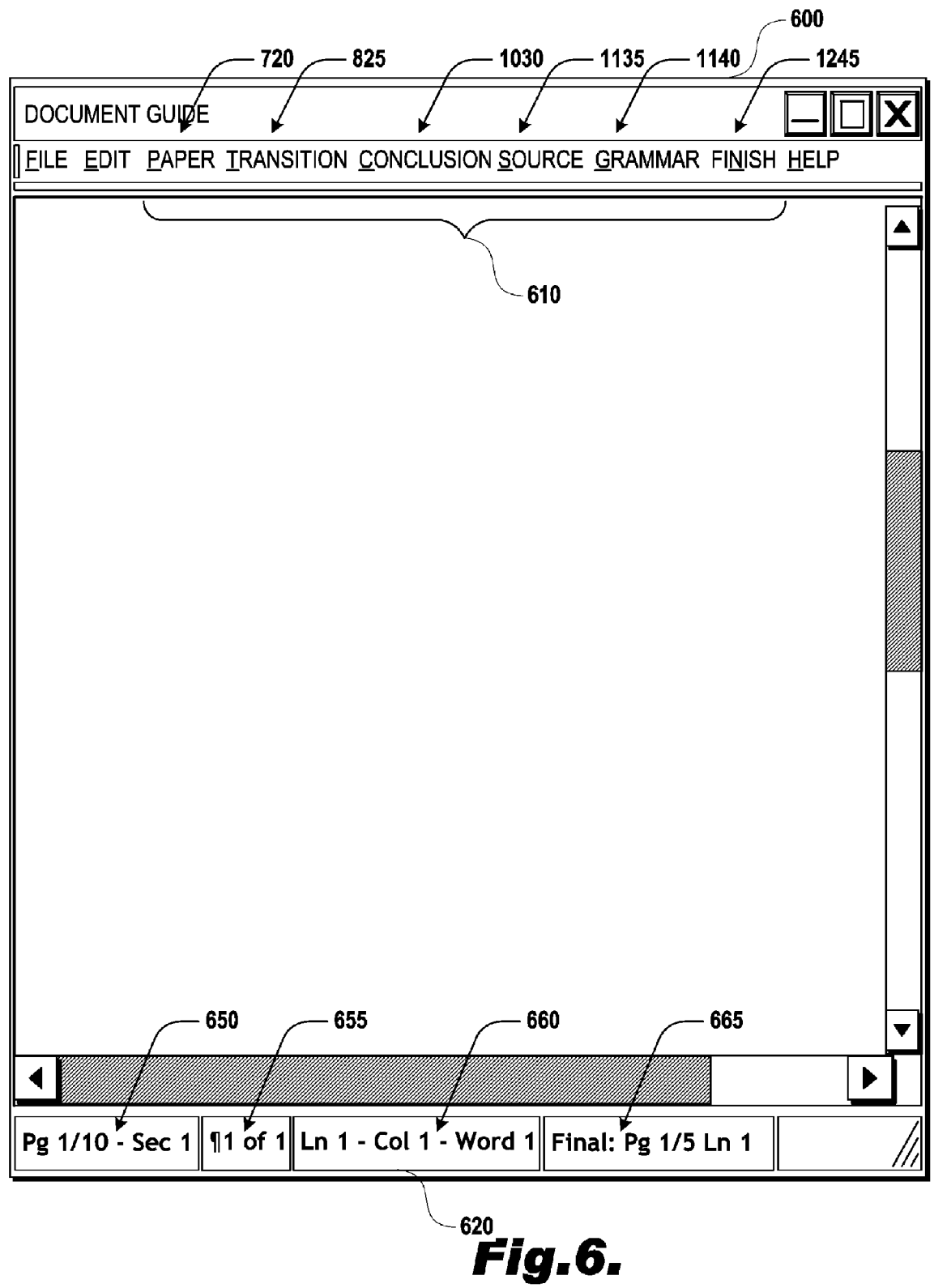
FIGS. 6-12 illustrate exemplary word processor user interfaces, in accordance with one embodiment.

FIG. 6 illustrates an exemplary word processor user interface 600 including various components of document composition software. These components include menu options 610 (including Paper 720, Transition 825, Conclusion 1030, Source 1135, Grammar 1140 and Finish 1245 options). Additionally, the word processor user interface 600 includes a status bar 620 having a number of status bar enhancements. The status bar enhancements include a page and section enhancement 650 that in addition to providing a listing of the current page and total number of pages of a current document, also provides a section identifier of current (e.g., where a text cursor is placed) section. The page and section enhancement 650 may optionally provide a total number of sections as well. The status bar 620 also includes a paragraph indicator 655 showing a current paragraph and a total number of paragraphs. Likewise a line, column and word indicator 660 indicates the current line of the document, the current column of a document and the current word of the document. The line, column and word indicator 660 may also provide totals for the lines, columns and words.

In addition to providing information about a current (draft) version of a document, the status bar may also include a "final" enhancement that shows what a final version of the document will look like. As documents of different types adhere to determined rule sets and/or standards, it is possible to determine the differences between the characteristics of a current document and a final document. For example, a current draft of a document with double line spacing, two inch margins, and a twelve point "Arial" font, is predictably different from a finalized version with single line spacing, one inch margins, and a ten point "Times New Roman" font. The final enhancement 665 provides a drafter of the document with predictive indication of the drafters progress in drafting the document.

In some embodiments, the final enhancement 665 may utilize a virtual finalized version of the current draft document to determine the pagination and line numbering. In other embodiments, predictive algorithms may be employed to estimate pagination and line numbering based on the differences between a draft document's margins, columns, fonts, and the like.

Figure 7:
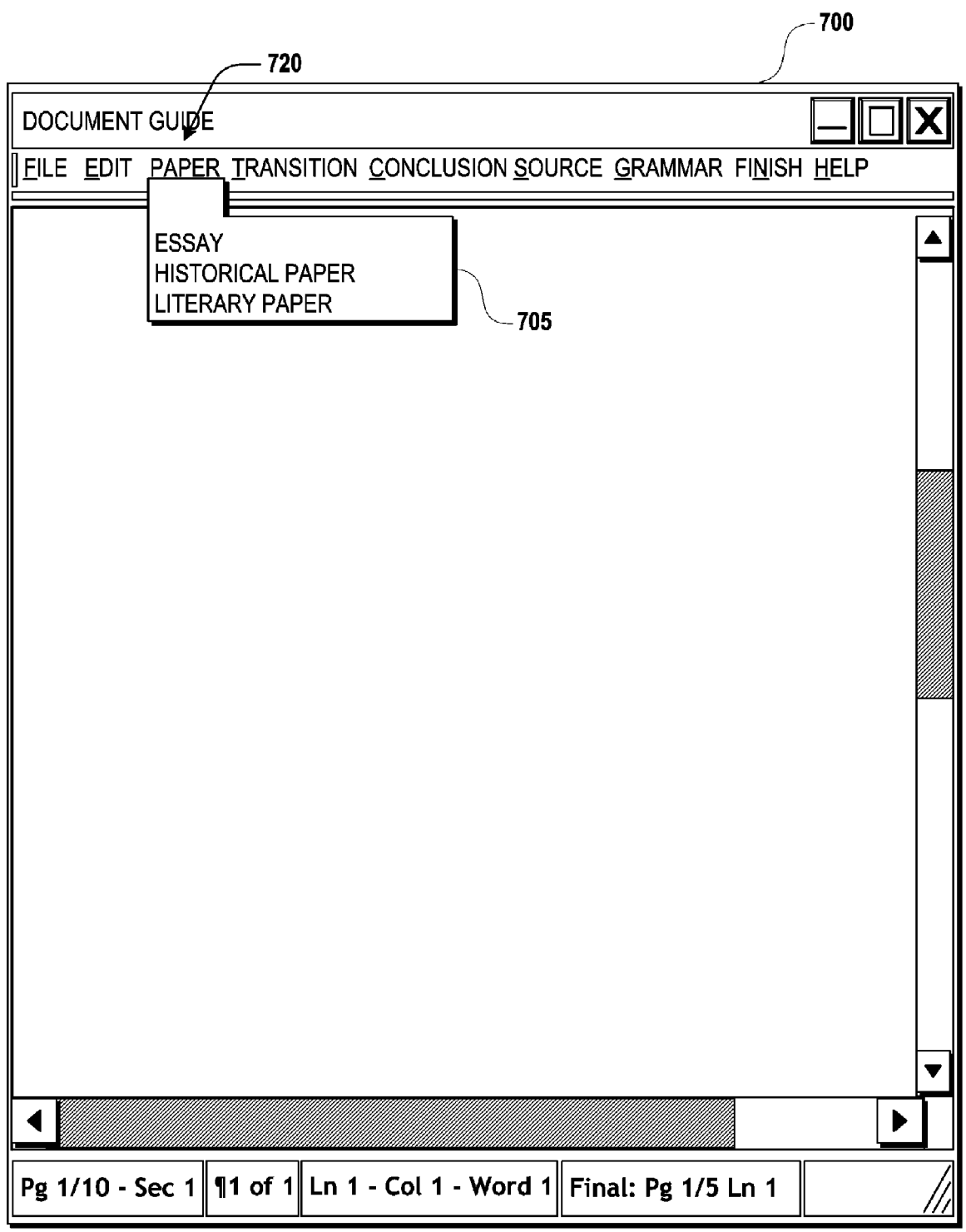

FIG. 7 illustrates an exemplary word processor user interface 600 wherein the paper menu option 720 has been selected to display a drop-down menu 705. In exemplary embodiment, the drop down menu comprises a selection of the following:

Essay;

Historical paper; and

Literary Paper

In further embodiments (not shown), addition (or fewer) document types (or subtypes) may be selectable from menu 705 (or other selectable user interface elements). Exemplary additional types/subtypes may comprise:

INFORMATIVE PAPER: This paper only wishes to inform the reader.

PERSUASIVE PAPER: This paper seeks to prove a point.

COMPARE AND CONTRAST: Comparing means that two concepts are the same. Contrasting means that two ideas are different.

CREATIVE WRITING: This is a whole different type of paper, which generally does not require you to use sources. However, you can still use your word processing program to format your paper to fit MLA or other guidelines.

Figure 8:
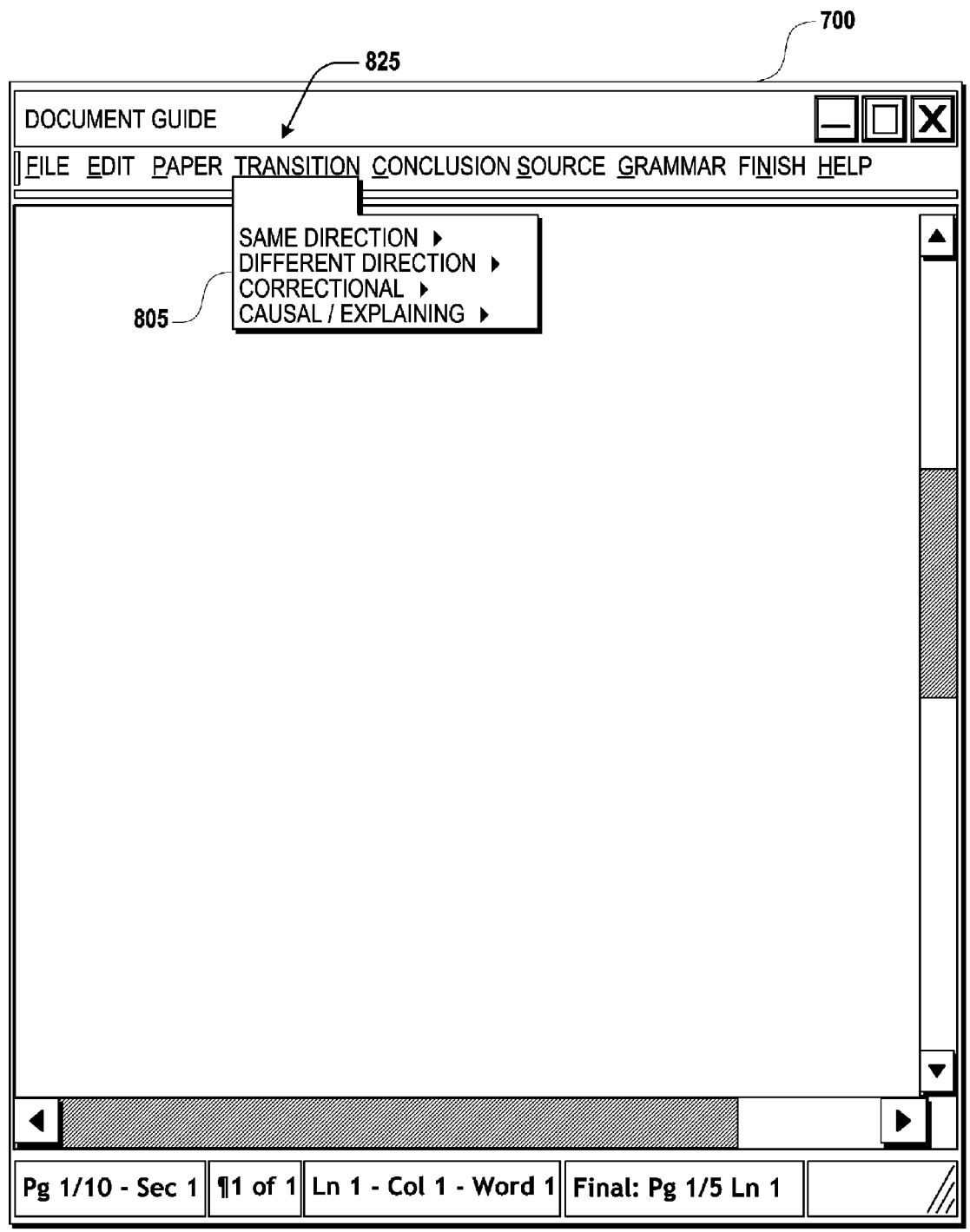
Figure 9:
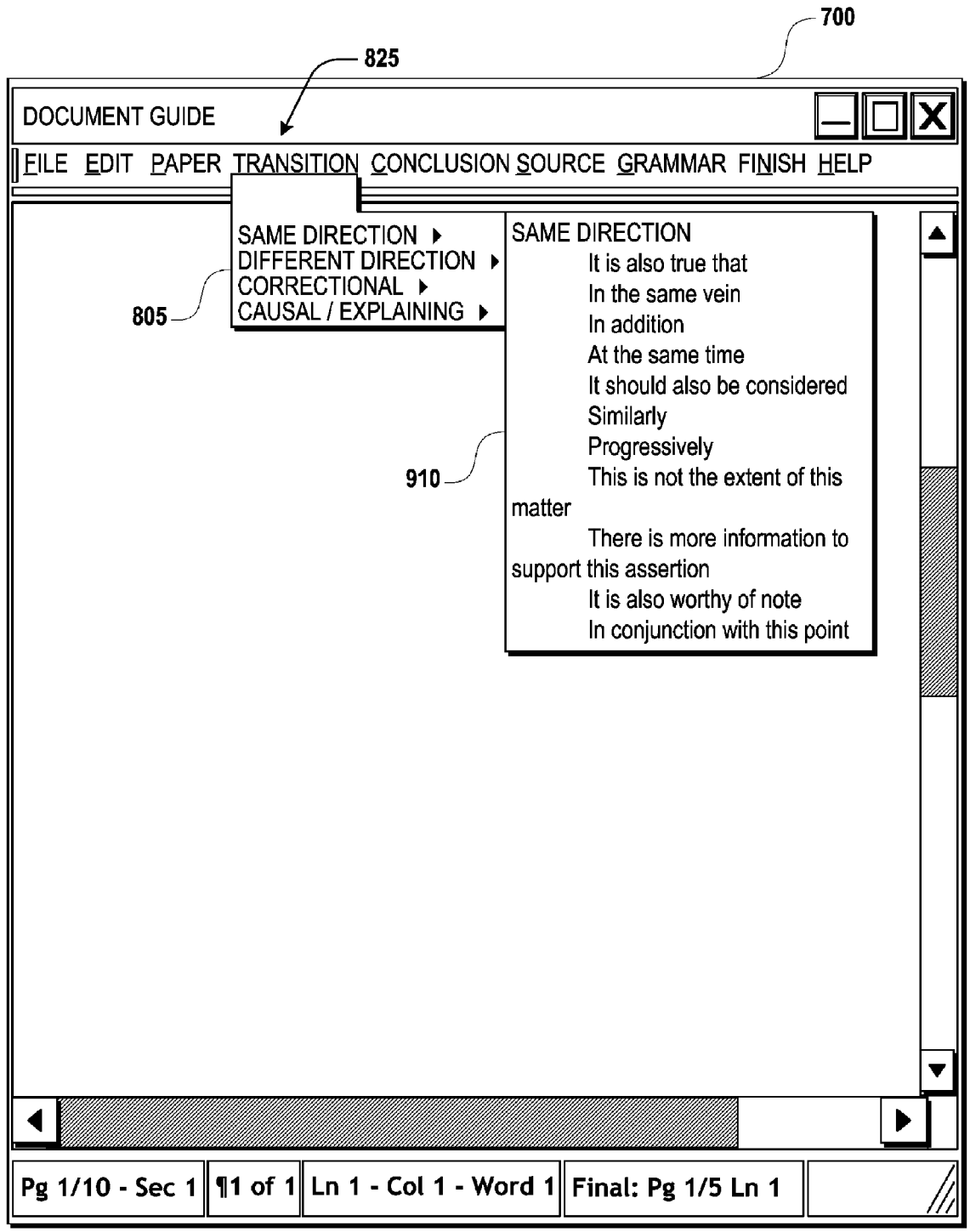

FIG. 8-9 illustrate an exemplary word processor user interface 600 wherein the transition menu option 825 has been selected to display a drop-down menu 805. In one embodiment, clicking on the transition menu button 825 triggers a drop menu with four choices (listed below as A through D) which, when selected, may open (waterfall) a second drop down menu 910. This second drop menu may present items to insert into the document that the user selects from the menu. Once the item is selected, the program automatically copies and pastes the selection into the document at the last cursor location. The first drop menu lists are followed by the secondary lists:

Same Direction (1) It is also true that
(2) In the same vein
(3) In addition
(4) At the same time
(5) It should also be considered
(6) Similarly
(7) Progressively
(8) This is not the extent of this matter
(9) There is more information to support this assertion
(10) It is also worthy of note
(11) In conjunction with this point Different Direction (1) However, it is also true that
(2) Despite these facts
(3) Although
(4) However, it should be considered
(5) Still, one must take into account
(6) Be that as it may
(7) Insomuch as that is true, it is also true that
(8) Despite this
(9) Unfortunately
(10) Even though
(11) At the same time, one must acknowledge
(12) This fact alone is misleading, unless
(13) Yet, this is not the entire story
(14) Though this seems to indicate
(15) This position is valid, however, when one considers
(16) However, it is not that simple
(17) In contrast
(18) Insofar as this is accurate, there are other interpretations
(19) Insomuch as this is true, other facts cannot be ignored Correlational (1) The inference can be drawn that
(2) This certainly implies
(3) This suggests
(4) This propagates the idea
(5) An example of this can be seen in
(6) This idea is easily observed
(7) This is evidenced by
(8) This idea/concept is given credence by the information
(9) These ideas are bound by
(10) There is cohesion between/among these facts
(11) These ideas are correlated/allied/interrelated
(12) These theories are associated/linked by a common theme -continued Causal/Explaining (1) This is true because
(2) This makes sense because
(3) This certainly suggests that
(4) The implications are obvious
(5) It is obvious that
(6) One must understand that
(7) This point must be taken in context
(8) These points lead to the truth that
(9) It must follow that
(10) Because of this, it must then be true that In alternate embodiments, both fewer and more menu options may be listed.

Figure 10:
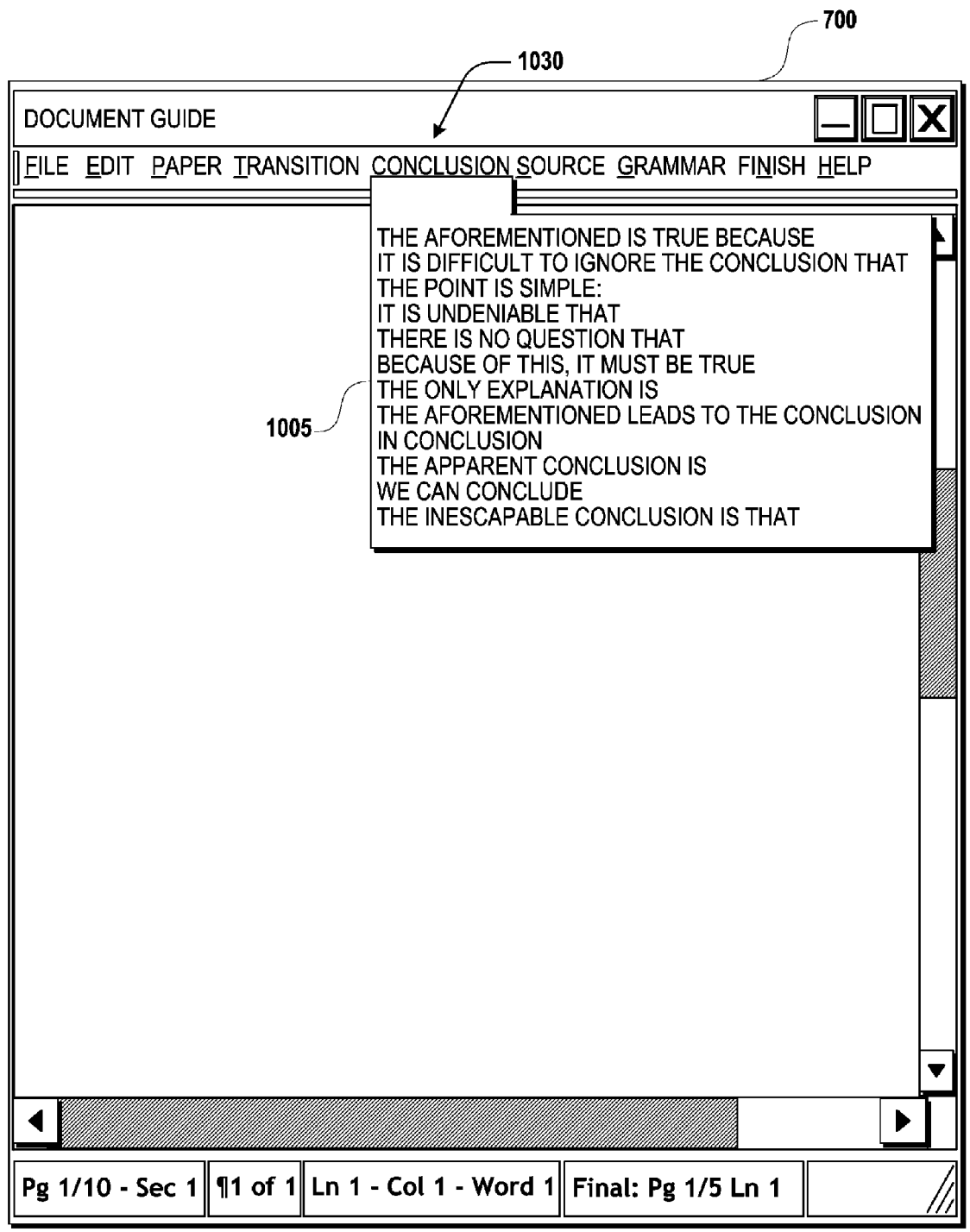

FIG. 10 illustrates an exemplary word processor user interface 600 wherein the conclusion menu option 1030 has been selected to display a drop-down menu 1005. This conclusion menu option 1030 triggers a drop menu 1005 with choices which, when selected, may present items to insert into the document by copying and pasting the item into the document at the last cursor position. In one exemplary embodiment, the items on the drop menu may comprise:

The aforementioned is true because
It is difficult to ignore the conclusion that
The point is simple
It is undeniable that
There is no question that
Because of this, it must be true
The only explanation is
The aforementioned leads to the conclusion
In conclusion
In sum
The apparent conclusion is
We can conclude
The inescapable conclusion is that In alternate embodiments, both fewer and more menu options may be listed.

Figure 11:
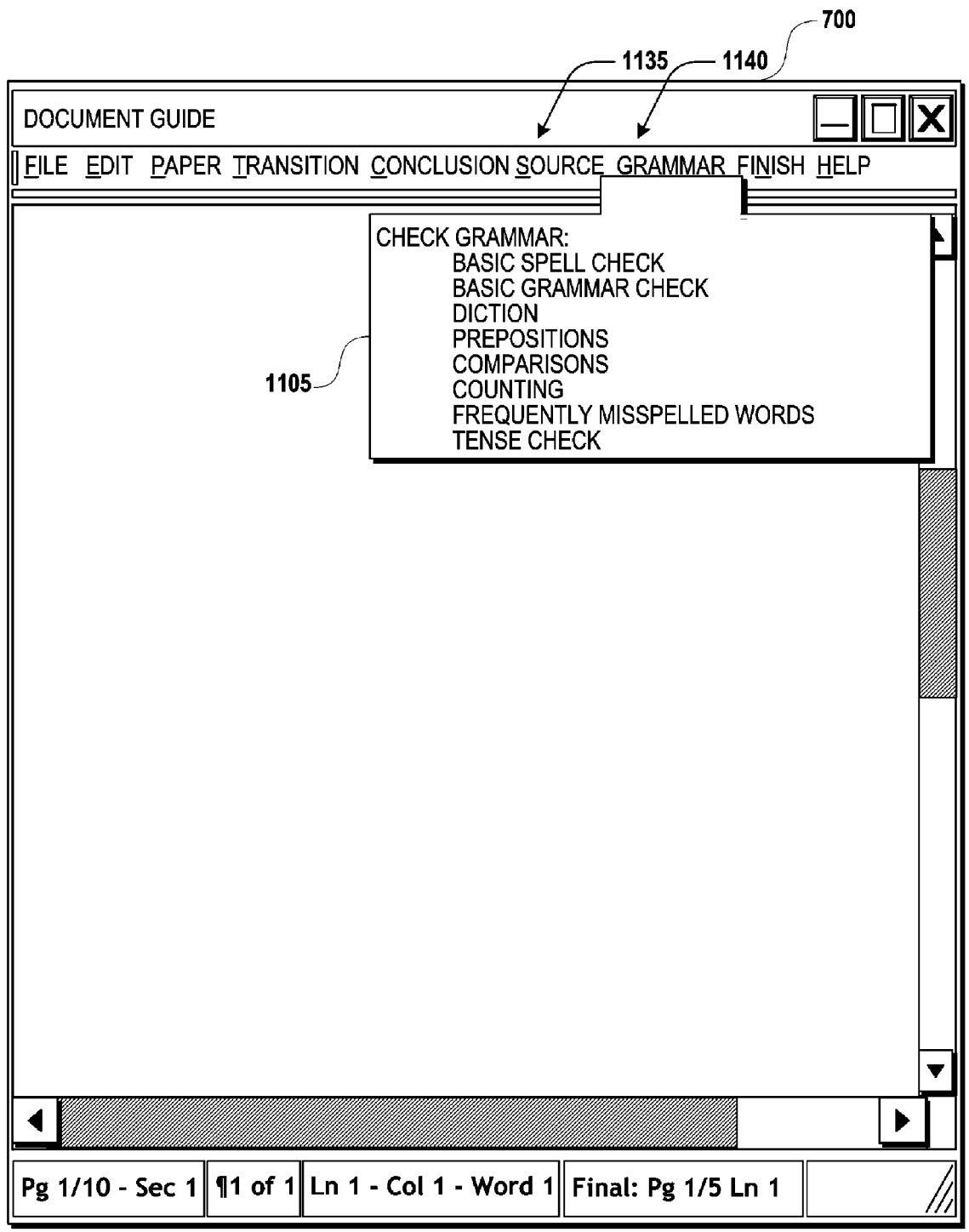

FIG. 11 illustrates an exemplary word processor user interface 600 wherein the grammar menu option 1140 has been selected to display a drop-down menu 1105. One exemplary set of options in the grammar button menu 1105 may comprise:

Basic spell check;
Basic grammar check;
Diction;
Prepositions;
Comparisons;
Counting;
Redundancy;
Frequently misspelled words; and
Tense check.

In alternate embodiments, both fewer and more menu options may be listed.

Likewise, a similar drop-down menu (not shown) would be displayed for source instructions and for adding quotes if the source menu button 1135 were selected. Source documenting instructions have already been discussed above, and are further discussed in the Appendices below. The source menu button 1135 may trigger a drop menu that may prompt the user to select if he or she wishes to use a new source or a source that has already been used in the document. This information may be saved in the document so that the same information does not have to be reentered. Once an source information has been entered, that source may appear on the drop menu. When the user selects the finish button 1245 the information that has been entered may automatically configure the information to fit the current document's format. However, the actual format instructions may not necessarily be revealed to the user.

Entering Quotes and Information:

In one exemplary embodiment, a dialog box will pop up asking the user "what are your main points?" with a list of different main points.

The user will type in each main idea.

A dialog box will pop up asking the user to enter a quote, fact or piece of information for the document from a source.

The program will then ask which main point this information supports.

After the user enters a piece of information, the computer will code that information as "field 1, field 2, etc." The user will then be prompted to return to the main body of the document and insert by mouse click the information to be attributed to a particular source. The dialog box will prompt the user to select a source from the Source Button. The user will be prompted to enter a page number or "no page number." The information will be cut and pasted into the document according to the specifications already laid out in the Source Button description.

In various embodiment, the points will be listed under bullet format. When the user clicks on one of the bullets or the piece of information, a dialog box will appear. The user will be asked to introduce the quote.

Accordingly, the user is provided with a flexible structure in this process. Every paragraph follows a simpler or more complex version of the same format. Each quote should be introduced. The quote or piece of information needs to be given (which has already been entered as text), the quote must be explained with respect to what it means and how it is connected to the main point, then there must be a transition to the next piece of information or idea. In other words: introduce the quote, give the quote, explain the quote and how it attaches to the main idea and transition.

There, in one exemplary embodiment, the user is asked the following questions: Why are you using this particular piece of information? Why is it important? How does it relate to the point you are making in this paragraph? How does it relate to the other quotes you are using? Do you agree or disagree with the author of this piece of information? Why? Do other sources agree or disagree with this author?

The answers to these questions and any relevant ideas that occurred while answering them are used to write a few sentences that will introduce a quote. For example: There are many pieces of evidence that support the point . . . "

Figure 12:
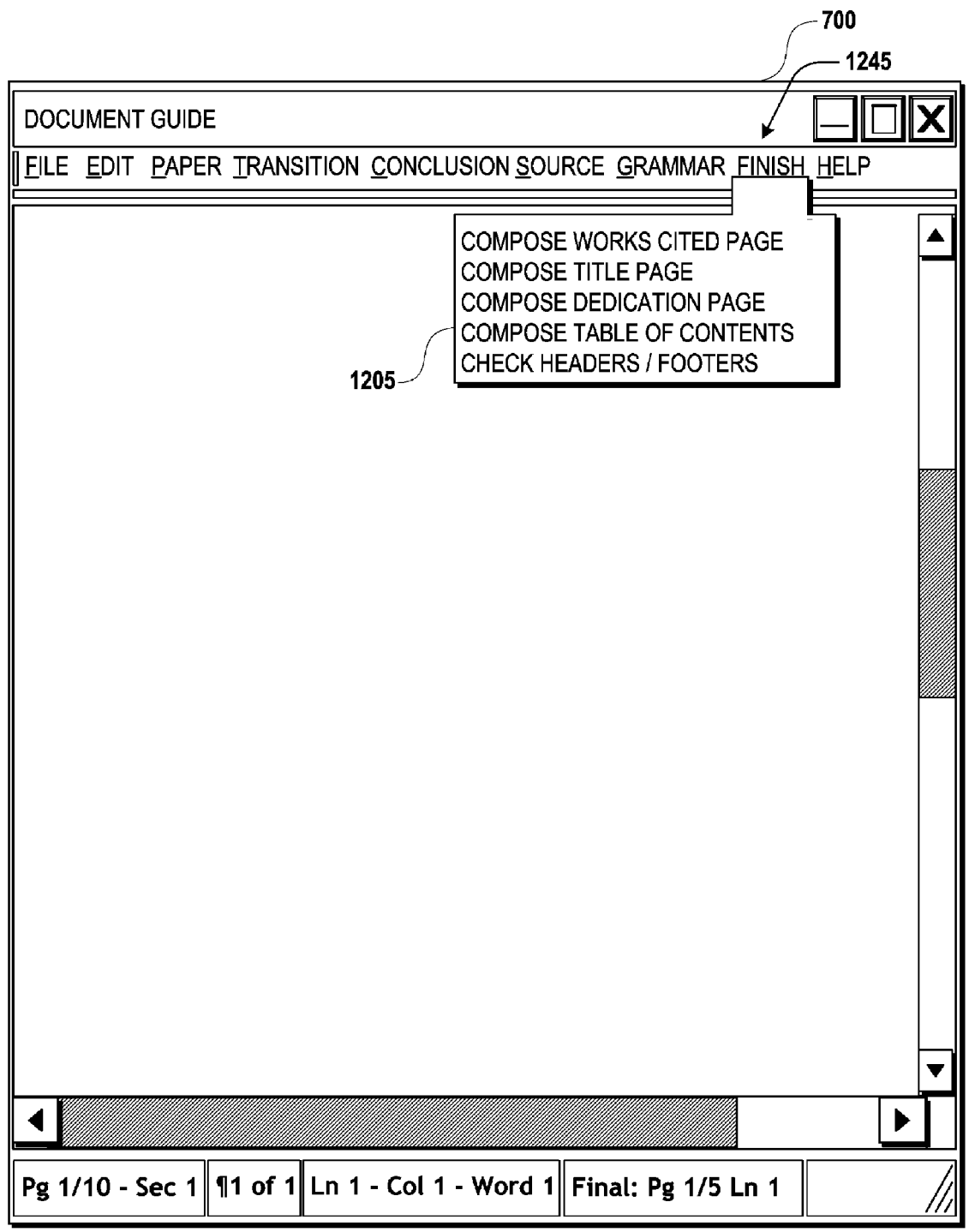

FIG. 12 illustrates an exemplary word processor user interface 600 wherein the finish menu option 1245 has been selected to display a drop-down menu 1205. On exemplary set of options in the grammar button menu 1105 may comprise:

Compose works cited page;
Compose title page;
Compose dedication page;
Compose table of contents;
Final spacing/format; and
Check headers/footers.

In alternate embodiments, both fewer and more menu options may be listed.

In still other embodiments, as part of the finishing instructions for the document, a dialog box may pop up which prompts the user to begin spelling and grammar checking the document. This dialog box may contain two separate checkboxes, one for spelling and one for grammar, in a format substantially similar to the following:

Begin spell check

Begin grammar check

In an exemplary embodiment, these functions may link to the word processing program's own spelling and grammar check functions. The spelling check function may run two cycles sequentially. The first cycle may be the word processing program's own spell check function. The second cycle may comprise of a dialog box popping up, with text substantially similar to the following:

Random Capitalization

Many writers make the mistake of capitalizing words just because they think those words are important. Make sure that you have not fallen into that trap. The only words which should be capitalized in the body of your document are:

words that begin a sentence proper names/nouns (people, places, or things)

titles names of languages

Take a moment now to make sure that your spell-check program has not randomly capitalized words that you do not want capitalized. If you are not sure which words should be capitalized, look them up quickly in a grammar text or online resource, or ask your proofreader.

There may be a small checkbox on the bottom of this screen which will allow the user to avoid seeing this reminder in the future:

"Don't remind me again"

After the spelling check function is completed, the dialog box may reappear with the spelling check button checked, indicating that this function has been completed. The user may then select the grammar check function.

The grammar check function may also run two cycles sequentially. The first cycle activates the word processing program's own grammar check function. Once that is completed, the program may automatically begin the second cycle. The second cycle may consist of three parts. In the first part, the program may run a scan through the document in accordance with the type of document selected by the user. For example, a history paper may cause a scan to run which searches for verbs that are not in past, past perfect or future perfect tense, other than those verbs appearing in quotes. The program may also search the document generally to ascertain if any words are not in past tense, other than words appearing in quotes. If a word is found which does not fit the formatting of the type of document selected, the program may identify that text as "fault1", "fault2", etc., and may launch a dialog box substantially similar to the following:

The word or phrase "[fault1]" was found in your paper. "[Fault1]" does not keep to the tense requirement for this type of paper. Would you like to change "[fault1]"? Where [fault1] is a portion of a document that does not conform to a current document's rule set.

In part 2 of the second cycle, the program may search the document generally for grammar errors missed by the word processor.

In part 3 of the second cycle, the program may run a scan through the document for the words and phrases listed in the following table. If any of the words and/or phrases are found in the document, a dialog box may appear with the appropriate heading (as indicated on the table below) with the word or phrase found and a definition of that word as well as a possible replacement word and the replacement word's definition or an explanation of how to use a particular word (e.g., the "Prepositions" section).

Diction, Prepositions, Comparisons and Counting

DICTION—Make sure you are choosing the right word for what you mean (See Appendix F).

There may be a small checkbox on the bottom of this screen which will allow the user to avoid seeing this reminder in the future:

"Don't remind me again."

Additionally, in exemplary embodiments, a user may add his/her own words to the frequently mistyped words list. This would be accomplished by adding a check box at the bottom of the text box that appears during frequently mistyped words cycle of spelling and grammar check. The box would read: "I would like to add a word that I frequently mistype." When the user fills the box with a checkmark, Textbox appears stating:

"The program can check for any word you like. Please enter the word that you want the program to check and the program will check each time this word occurs and add the word to the spelling and grammar check."

"What I type:" Program leaves space for user to enter a word.

"What I mean to type:" Program leaves forty spaces for user to enter a word.

User selects "Add Word"

In some embodiments a check for the added word(s) is performed using the "Find" function already available on word processing program. Additionally, if a user enters information under "What I mean to type", a "Find" and "Replace" functions already available on word processing program may be utilized to correct the user-added word.

The user-added word or set of words may be stored under the settings for the current user and the program will check for this/these words each time the user enters the spelling and grammar check cycle.

In further embodiments, redundancy checking is used with grammar checking. In one such embodiment, the program will check against a list of commonly used words (e.g. "stop words"), such as "the, this, that, a, an, his, her, him, she, they, etc., and exclude these words from the redundancy check. All other words will be checked. If any checked words match, both words are highlighted and the text box for dictionary, subheading synonyms is opened. The user will be prompted to change one of the words with one of the synonyms contained in the synonym list.

Additionally, some embodiment may have a button called "Previous Instructions or Settings". If the user selects this button, a drop down menu will appear with a list of all stages of writing a paper. This list will include: Finding an Idea, Research, Taking Notes, Entering Information, The Writing System, (List each level of Spelling and Grammar Check), Thesis Statement, Introduction, Conclusion, List each section of Finish button.

In this way, the user can return to sections of the paper in which he/she could have erroneously entered a preference or made a selection which he/she now wishes to change.

In addition, there may, in some embodiments, be another button labeled "Preferences" in which the user is presented with a drop menu of all the types of selections he/she can make. In this function, the user can change Spelling and Grammar specifications, and change any other specifications with which the user is presented throughout the writing process. This will include if the user wishes to change documentation style (MLA, APA, Chicago), etc.

In one specific embodiment, upon selecting the finish button, the following actions may be taken automatically, including:

Spacing: The document will be reformatted to double spacing (1) The user will be prompted to reformat long quotes. The program will search the document for beginning quote marks and ending quote marks that are more than four lines long. The program will change the quote tab to be ten spaces from the left margin, eliminate the quote marks and leave the quote in double spaced format.

A drop-down menu will then emerge from the Finish Button with the following options:
(1) Compose and Review Works Cited Page
(2) Compose Title Page
(3) Compose Dedication Page
(4) Compose Table of Contents
(5) Compose and Review Header/Footer
(6) Works Cited Page Format Exemplary instructions for formatting of the "Works Cited" page may comport with the following formats:

The words "Works Cited" are to be centered on the top of the page.

The words "Works Cited" and all other words on the page are to be in Times New Roman 12-point font with one inch margins and without bold, all caps, quotation marks, or underlining.

There is a double space between the title of the page and the first citation.

All citations are in alphabetical order, according to the first letter of each citation.

The page is double spaced.

Double spacing between citations

Double spacing within citations

Citations that run longer than one line have the second and any further lines indented five spaces The citation page has a page number.

Specific Format for Each Cite in the Works Cited Page
(1) Book: [Author's last name, Author's first name Author's middle initial. Title of Book. City of Publication: Publisher, Year of Publication.]
(2) Book with two authors: [First author's last name, First author's first name First Author's middle initial, Second author's first name Second authors last name Title of Book. City of Publication: Publisher, Year of Publication.]
(3) Book with more than two authors: [First author's last name, First author's first name, First author's middle initial, et al. Title of Book. City of Publication: Publisher, Year of Publication.]
(4) Book with no author: [Title of Book. City of Publication: Publisher, Year of Publication.]
(5) Anthology or Compilation: The anthology itself: [Editor's last name, Editor's first name Editor's middle initial, Ed. Title of Anthology. City of Publication: Publisher, Year of Publication.]
(6) Anthology or Compilation: A work within the anthology: [Article author's last name, article author's first name Article author's middle initial. "Title of Article." Title of Anthology. Ed. Editor's first name editor's last name. City of publication: Publisher, Year of publication. Page numbers.]
(7) Article from a professional or scholarly journal: [Author's last name, Author's first name Author's middle initial. "Title of Article." Title of Publication. Edition or issue (Year of Publication): page numbers.]
(8) Article from a magazine: [Author's last name, Author's first name Author's middle initial. "Title of Article." Title of Magazine. Day Month Year: Page numbers.]
(9) Newspaper article: [Author's last name, Author's first name Author's middle initial. "Title of Article." Name of Newspaper. Day Month Year, edition ed., Section number: Page Numbers]
(10) Reference Book Article: ["Title of Article." Title of Reference Book. Number of the edition (th ed.) Year of Publication.]
(11) Internet source: With author and article title: [Author's last name, Author's first name author's middle initial. "Title of Site." Year of Publication. Publisher. Day Month Year accessed <http://www.internetaddress>.]
(12) Internet source: With only author: [Author's last name, Author's first name and Author's middle initial. Year of Publication. Publisher. Day Month Year accessed <http://www.internetaddress>.]
(13) Internet source: With only title: ["Title of Site." Year of publication. Publisher. Day Month Year accessed <http://www.internetaddress>.]
(14) Internet source: With only Internet address: [<http://www.internetaddress>. Year of Publication. Publisher. Day Month Year accessed]

Compose Title Page

In one exemplary embodiment, selecting compose title page may cause a dialog box to appear, stating that a title page is no longer necessary in the MLA format, but that the program can construct one. If the user selects "Yes, I want a title page," the following questions will be presented in a text box: Title of document, instructor's name, class title, writer's name, date due. The format for the title page will be as follows:

Double Spacing
Page centered
Times New Roman 12 point font
Title of Document
Instructor's Name
Class Title
Writer's Name
Date Due If the writer selects "No, I do not want a title page," the user will still be asked for the title of the document. This information will appear in the top left corner of the first page in one of the two following formats, in accordance with the selection made at the beginning of the program:

Double Spaced
Times New Roman 12 point font
Title of Document
Instructor's Name
Title of Class
User's Name
Date Due
Or
User's Name
Instructor's name
Course number
Date As mentioned earlier, the user will be allowed to override these selections if so required by his or her instructor or by the format appropriate to the type of document.

Compose Dedication Page

If the user selects this option, in one exemplary embodiment, the user may choose from the following options:

Center
Page Center

The format of the dedication page is:

"This paper is dedicated to . . . "

These first five words are followed by any information the user wishes to enter. This page will directly follow a title page and have no page number or header.

Compose Table of Contents

In some embodiments, if the user selects this option, a dialog box will appear asking the writer a question(s), such as:

Outline format?

If yes, then the program will activate the outline function already available in the word processing program.

If no, the user can compile the Table of Contents page as he or she wishes.

The format for the Table of Contents page is:

Left justify

Times New Roman 12 point font

Double Spacing

No header or footer

No page numbering

This page directly follows the dedication page.

Centered at the top of the page are the words "Table of Contents."

Compose and Review Header/Footer

In exemplary embodiments upon selecting compose and review header/footer, the user will be prompted to enter information for the header or footer. For an MLA rule set document, the header is in the following format: writer's name, the Title of the Document, instructor's name. This header is to be centered and appear only on the second page of text and every page thereafter, excluding the works cited page. The information for the title of the document, the writer's name and the instructor's name will already have been saved by the program in the initial stages of selecting user name, and paper type.

Figure 13:
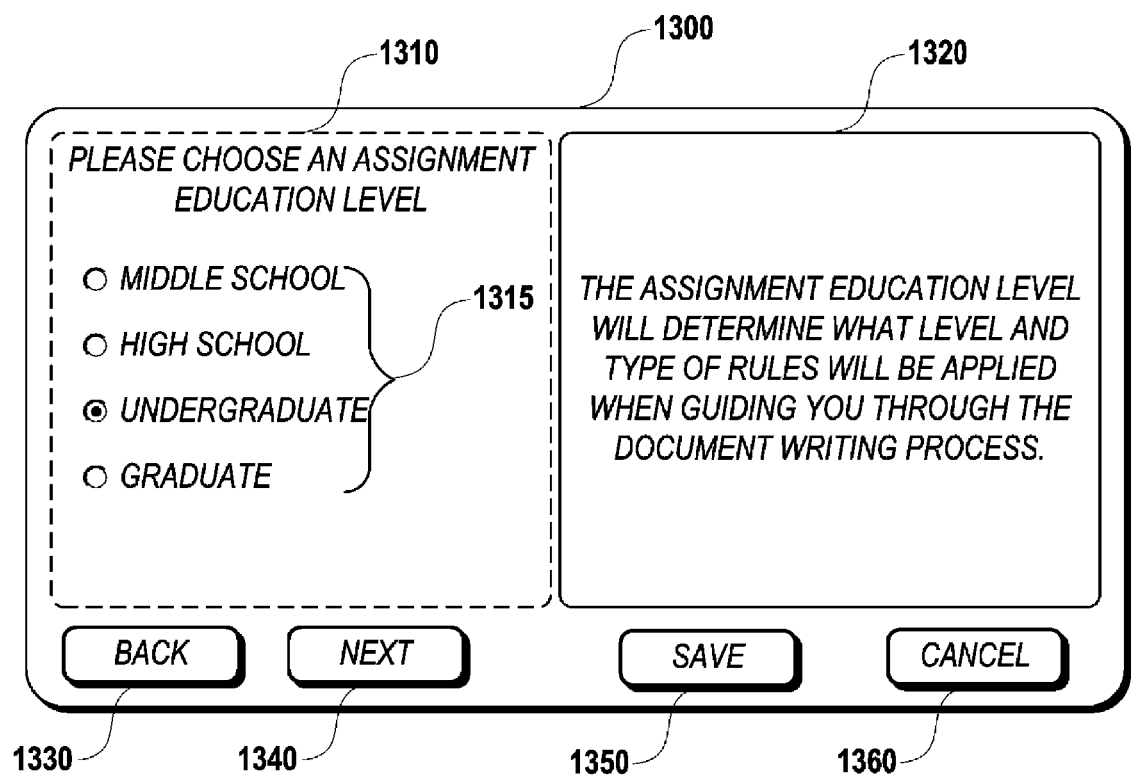
FIG. 13 illustrates an exemplary user interface element, in accordance with one embodiment.

Various embodiments imply user interface elements (e.g., dialog boxes, windows, forms, text fields, buttons, drop down lists, selection lists and the like) for gathering information from a user and providing information and instructions to a user. Accordingly, FIG. 13 illustrates an exemplary dialog box. User Interface Element 1300 for gathering information from a user. The exemplary Dialog Box 1300 comprises a query pane 1310, and instruction pane 1320, and a plurality of buttons 1330-1360. The buttons include a conventional "back" button 1330, a conventional "next" button 1340 and a conventional "cancel" button 1360. Also included is a "save" button 1350 for saving the current progress of a user within a series of Wizard dialog boxes such that the user can return to his or her saved position without having to re-enter information. An alternate embodiments, saving may be automatic, thereby making the "save" button 1350 optional. Additionally, Query Pane 1310 includes the number of selectable options 1315 (radio buttons) for selecting a grade level for a document. Note that not all documents may require a grade/education level. Therefore, a previous query (e.g., in a dialog box) may have indicated that an education level should be determined. Alternately, the response selected in the selectable options 1315 maybe be ignored if an education level is not required. In various embodiments implying a Wizard-like flow of dialog boxes, subsequent dialog boxes may vary the information requested and/or the accompanying instructions. For example, in a business memorandum document type, it would be foreseeable that the education level information would not necessarily be required. Therefore, exemplary Dialog Box 1300 may not be displayed in a series of information gathering dialog boxes if a user had previously specified a document type as a business memorandum document type.

FIGS. 14-19 illustrate an exemplary walkthrough of one set of actions when composition a historical research paper document. In some embodiments such a composition may be performed in a single session, however, in the exemplary composition walkthrough illustrated in FIGS. 14-19, the composition is shown as a series of contiguous sessions, with progress saved between sessions.

Figure 14:
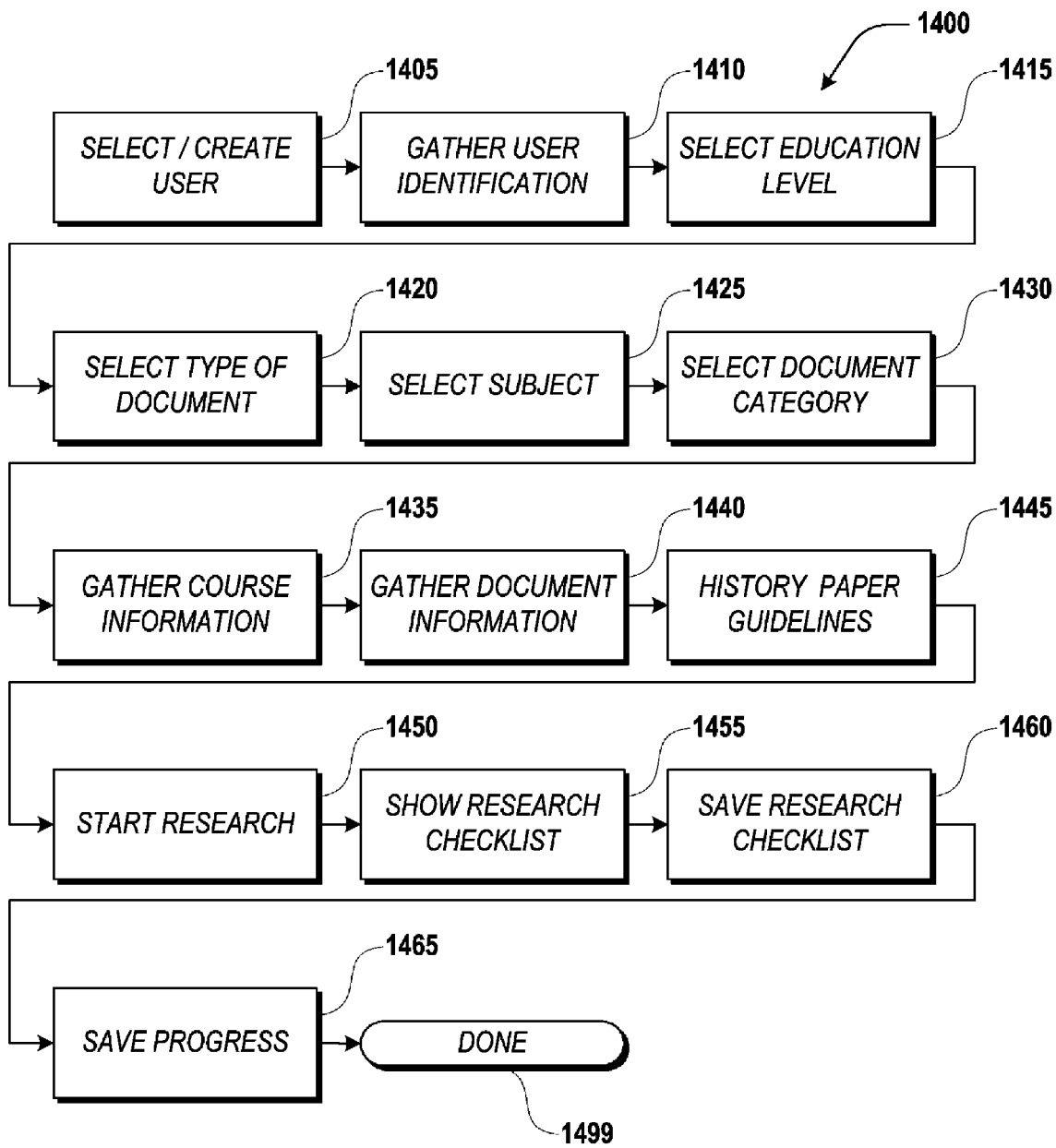
FIGS. 14-19 illustrate processes in an exemplary historical research paper walkthrough, in accordance with one embodiment.

FIG. 14 illustrates an illustrative flow diagram of the progress first portion 1400 of a historical research paper walkthrough. The first portion 1400 begins in block 1405 where a user is created or selected. For example, a menu drops asking:

Select User

New User Selected (Any person that has already used the program can select him/herself, already listed under the select user menu).

In block 1410, user information is gathered, for example:

Text Box appears asking questions, each question with a space for the user to answer:

First Name

Middle Name

Last Name

"Next" button appears.

"Next" button selected.

Textbox refreshes.

In block 1415, education level information is gathered, for example:

Select Level of Education:

Middle School (applies normal MLA standards)

High School (applies normal MLA standards)

College (applies normal MLA standards)

Graduate School (applies graduate MLA standards)

"High School" Selected

"Next" Button Selected

In block 1420, document type information is gathered, for example:

Menu drops asking:

Research Paper

Essay

"Research Paper" selected

In block 1425, subject information is gathered, for example:

Text box appears asking:

"What type of paper?"

History

Literature

Creative

Other

"History" is selected

"Next" button is selected

In block 1430, document category information is gathered, for example:

Text Box refreshes

"What specific category of paper?"

Informative

Persuasive

Compare and Contrast

Other

"Informative" is selected

"Next" Button is selected

In block 1435, document and course information is gathered, for example:

Text Box appears asking questions, each question with a space for the user to answer:

Title of Paper (if known)

Name of Class

Instructor's Name

Date Due (This information is stored in the file's memory to be used in compiling the title page or opening title, if the user chooses to put the information in the paper.)

"Next" is selected

In block 1440, paper specific information is gathered, for example:

Text Box Refreshes asking:
Length of Paper?
paragraphs
Word Count
Pages
"Pages" is selected
"Next" Button is selected
Text Box Refreshes asking a question with a space provided for the answer:
Number of Pages?
User type "5".
"Next" Button is selected In block 1445, history paper specific information is provided to assist the user with beginning the history paper process, for example:

Text Box appears stating:
"History papers should be written in the past tense, past perfect tense or future perfect tense, with the exception of information appearing in quotes."
Check box at bottom of text box states:
"Don't remind me of this again"
"Don't remind me of this again" is selected
"Next" Button is selected In block 1450, research information is provided to assist the user with beginning the research process, for example:

Text Box appears stating:
"It is time to do some research. Would you like to start now?"
Yes
No
"Yes" is selected In block 1450, research checklist information is provided to assist the user with the research process, for example:

Text Box appears asking:
"Would you like to view the Research Checklist?"
Yes
No
"Yes" is selected
Checklist appears as a separate document as follows:
(See Appendix D)

In block 1460, the research checklist information is saved, for example:

Text Box appears in lower right of screen asking:
Print
Save
Close this document
I know how to do research. Don't show me this again.

In block 1465, the user's progress is saved, for example:
User clicks "Save" Button
User shuts down word processor in block 1499.

Figure 15:
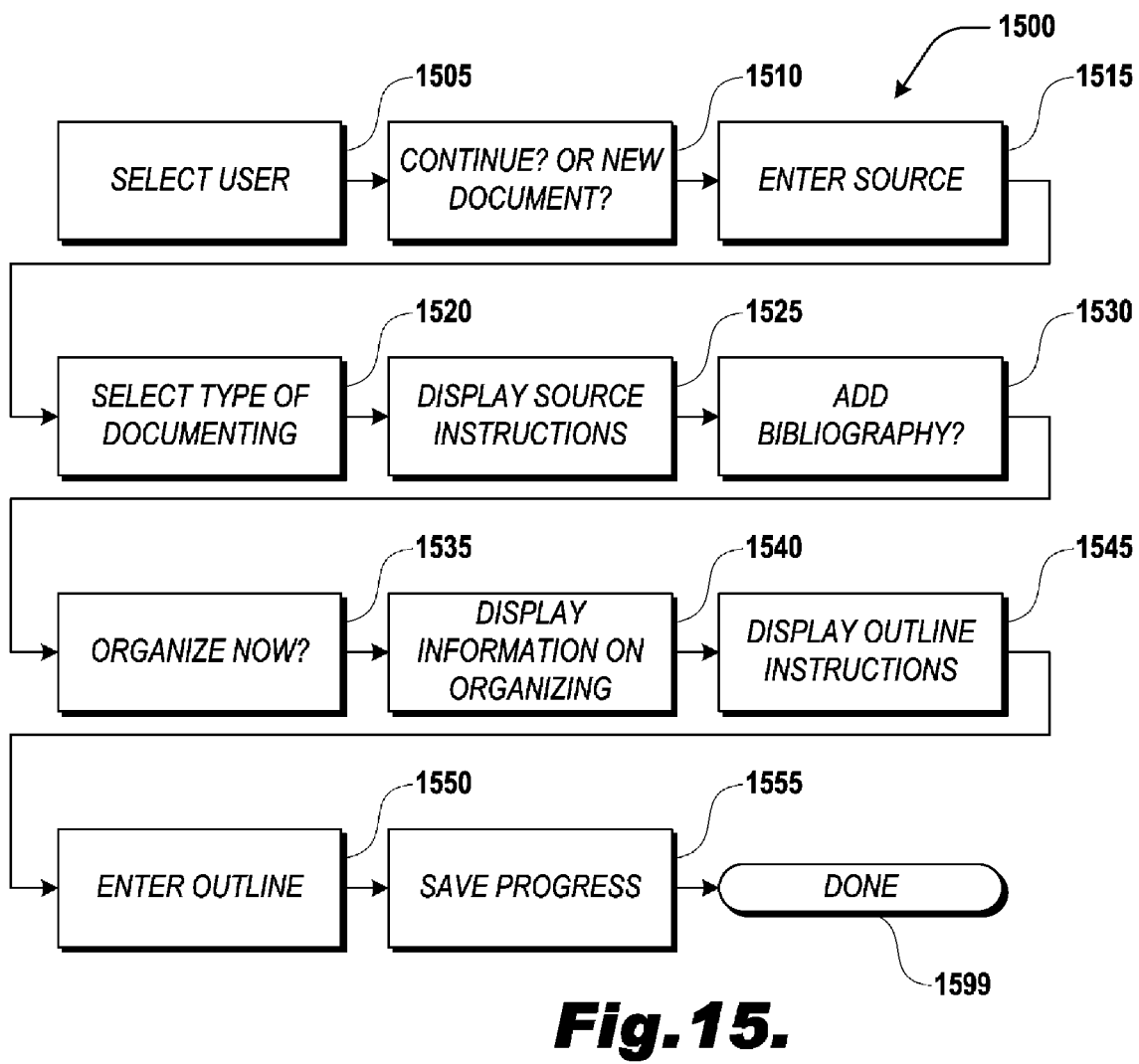

FIG. 15 illustrates an illustrative flow diagram of the progress of a second portion 1500 of a historical research paper walkthrough. The second portion 1500 begins in block 1505 where a user is selected. For example, a menu drops asking:

Select User
User selects his/her name that has been added to this menu. (Any person that has already used the program can select him/herself, already listed under the select user menu).

In block 1510, continuation information is gathered, for example:

Text Box appears asking:
New Paper
Continue/Edit Paper
User selects "Continue/Edit Paper"
Computer reestablishes all settings from last time user logged off.

In block 1515, the user is queried whether he/she wishes enter source information, for example:

Text Box appears asking: "Enter Source Information Now?"
Yes
No
User selects "Yes"

In block 1520, the user is queried as to the type of documentation desired, for example:

Text Box appears asking:
"What type of documentation style?"
MLA (This is the format that most high schools and colleges require)
APA
Chicago
MLA selected
"Next" Button is selected In block 1525, the user is presented with source documentation instructions, for example:

Text Box appears:
"You will be asked to select different types of sources and then enter all the information needed. The information you enter will automatically be configured into proper documentation format and the program can then put your works cited page together.

Each time you add a new source, the program will add the source to the "Sources" drop menu If you click the "Sources" button, the author's name or the name you have assigned to the citation will appear in the drop menu.

When you select the source you want, you will be asked for the page number.

This information will then be added to your paper at the last cursor position."

In block 1530, the user is queried whether he/she wishes to enter bibliographic information, for example:

A text box appears with:
Add bibliographic information now.
Remind me later.
User selects "Add bibliographic information now."
"Next" button is selected In block 1535, the user is queried whether he/she wishes to organize their information, for example:

Text Box appears asking:
"Organize your information now?
Yes
No
User Selects "Yes"
Text Box appears asking:
"Would you like to view information on organizing your information?"
Yes
No
"Yes" is selected In block 1540, the user is presented with organization information, for example:

Checklist appears as a separate document as follows:
(See Appendix E)

Figure 16:
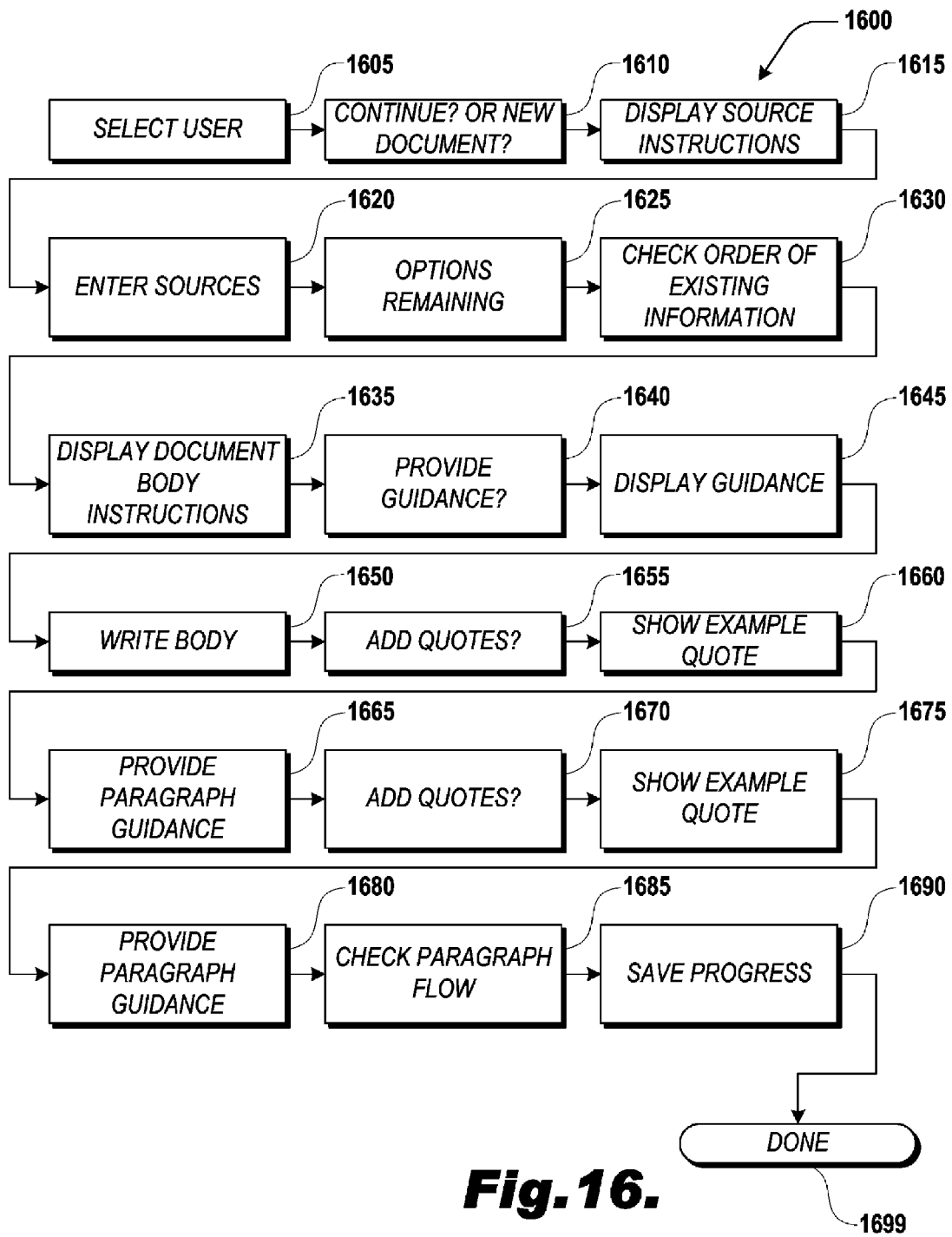

In block 1545, the user is presented with outlining instructions, for example:

Text Box appears stating:
Type the outline into the computer, leaving several spaces between each entry
User clicks "OK" at bottom of Text Box
In block 1550, the user is presented with space to enter an outline, for example:
Text Box appears in bottom right corner of screen stating:
"Click OK when you have entered your outline"
User enters outline text.
User clicks "OK" button.
In block 1555, the user's progress is saved, for example:
User clicks "Save" Button
User shuts down word processor in block 1599.
FIG. 16 illustrates an illustrative flow diagram of the progress of a third portion 1600 of a historical research paper walkthrough. The third portion 1600 begins in block 1605 in which a user is selected. For example, a menu drops asking:
Select User
User selects his/her name that has been added to this menu. (Any person that has already used the program can select him/herself, already listed under the select user menu).
In block 1610, continuation information is gathered, for example:
Text Box appears asking:
New Paper
Continue/Edit Paper
User selects "Continue/Edit Paper"
Computer reestablishes all settings from last time user logged off.
In block 1615, source (and quote) instructions are provided, for example:
Text Box appears stating:
"It is time to enter all of the quotes and other pieces of information you have. After you enter each piece of information and hit the RETURN key, you will be prompted to select a source from your Source menu. Simply enter the page number, if known, and the citation will be added after your quote or piece of information"
Start now
I'll start later
User selects "Start Now"
"Next" is selected
In block 1620, source and/or quote information is gathered, for example:
Text box appears in bottom right corner of screen stating:
"Click OK when you have finished entering all of your information"
User selects "OK" button
In block 1625, options available to start writing the paper are presented, for example:
Text Box appears stating:
"Finally, it is actually time to write! It is generally best to write the body of the paper first, leaving the introduction and conclusion until last. Select from the following options:"
Write Introduction
Write Body
Write Conclusion
"Click OK to begin"
User selects "Write Body"
User clicks "OK" button
In block 1630, instruction on the order of paper information are presented, for example:
Text Box appears stating:
"Make sure your information and quotes are in the order in which you wish to use them"
Yes they are
User clicks "OK"

Figure 17:
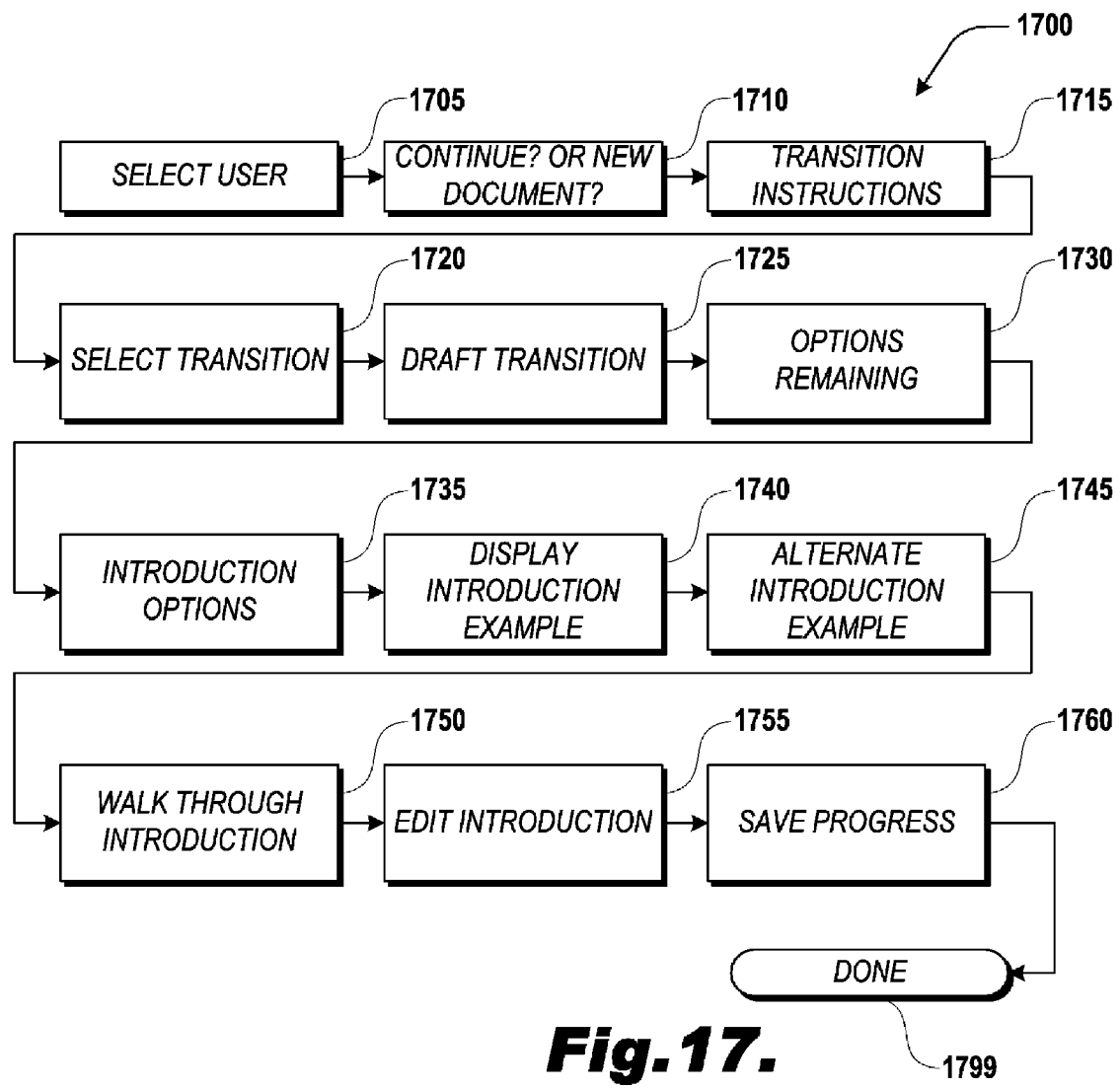

In block 1635, paper body instructions are provided, for example:
Text Box appears stating:
"Are you familiar with the easiest way to write a paper?"
Show me the method
I have already been through the tutorial and know the method
I know this method well, don't show me this again
User selects "Show me the method"
"Next" button is selected
Text Box appears stating:
The Writing
Hook all of the quotes together in the outline you have laid out using this FORMAT:
Introduce the quote
Give the quote
Explain the quote and how it relates to your thesis/main ideas
Transition to the next idea
Remember: Take nothing for granted. Never assume the reader knows anything. Answer the questions:
(1) Why is this piece of information important?
(2) How does it relate to your thesis statement?
(3) Is there a chronological order that you should point out?
(4) Does this idea relate to anything else?
The user is then asked in block 1640 whether he/she needs guidance while writing the paper. For example:
A text box appears:
I would like guidance as I write the paper
I know this method and do not need any guidance
User selects "I would like guidance as I write the paper"
"Next" button is selected
The user is then provided, in block 1645, with paper body composition guidance while writing the paper. For example:
Text Box appears stating:
"Put your cursor at the beginning of the first quote you want to write information for. For example: if your first quote is "Abraham Lincoln lived in Illinois", put the cursor right before the quotation marks in front of Abe Lincoln's name. Click OK to continue"
User clicks "OK"
Next, in block 1650 the user begins writing the body of the paper.
Text Box appears at bottom right of screen stating:
"Click OK when your cursor is where you want it"
User clicks "OK"
Text Box appears stating:
"Look at the quote or piece of information. You need to introduce this information. What is the main point that you are trying to make about this piece of information?"
(Space is left for the user to type up to three hundred characters)
"When you are finished, click OK"
User clicks "OK"
Information user typed into Text Box is selected. Control X is performed. Control V is performed and the information is pasted in front of the last cursor position, leaving two spaces before the cursor position.
In block 1670, the user is queried as to whether any quotes are to be added to the paper. For example:
Text Box appears asking:
"Do any other quotes or pieces of information need to be put into this paragraph?"
Yes, I will place the information there myself
No, I am ready to finish the paragraph and go onto the next paragraph
I don't know, show me an example User selects "I don't know, show me an example"
"Next" button is selected
In response, block 1660 presents an example quote, for example:
Large Text Box appears stating:
"Many times, when people are writing papers, certain small pieces of information do not give enough information to form an entire paragraph. For example: many people like to add biographical or background information all in one shot near the beginning of a paper. If you were writing a paper about Abraham Lincoln and wanted to include information about his upbringing, this might go something like this:
Introduce the quote(s) or piece(s) of information: Abraham Lincoln's background is very important to understanding the decisions that he made as president.
Now you need to add several pieces of information. If they are from the same author, you can simply give all of the information and put a single source at the end.
You can add: Lincoln was born in Tennessee to a father who he despised and a mother who was rather cold. This was a rocky start for the future president. By the time he moved to Illinois, Lincoln was a highly independent thinker. This suited him well in the legal profession (Smith 22-24).
If all of this information came from one source, you can simply click the Source button, select the source and add the page numbers. The program will paste this information into the paper for you.
Thereafter, you still need to explain the information and provide a transition."
Click OK to continue
User clicks "OK"
In block 1680, the user is assisted with the writing of their paragraphs in the paper body. For example:
Text Box appears asking:
"Do the pieces of information you used flow together?"
Yes, continue
No, I need help
User selects "No, I need help"
"Next" Button is selected
Text Box appears stating:
"All you have to do is put a connection between the pieces of information. For example, if you know that you want to put these two pieces of information together: "Lincoln read a great many books as a young man" and Lincoln became a lawyer, you can simply add the connection between them that makes the two flow together. For example: "Lincoln read a great many books as a young man," and perhaps because of his love for history and politics, Lincoln became a lawyer (Smith 23).
Click "OK" to continue
User clicks "OK"
Text Box appears asking:
"Do the pieces of information you used flow together?"
Yes, continue
No, I need help
User selects "Yes"
"Next" Button is selected
Text Box appears stating:
"You must tell exactly what the quote means. Do not take it for granted that the quote explains itself"
Explain the quote: (Space is left for the user to respond with up to five hundred characters)
Hint, you can use the Conclusions button to start sentences when you are explaining.
Would you like to use the Conclusions Button?
Yes Click OK when finished
User clicks "OK"
Control-X (cut) is performed on the information in the space provided.
Control-V (paste) is performed to paste the information into the paper at the end of the quotes and other pieces of information that the user entered previously
If user selects Conclusions button, conclusions drop menu is activated. Whatever user selects from drop menu is copied from the menu and pasted into the space left for the user to respond with up to five hundred characters as the previous text box refreshes.
Text Box refreshes stating:
How is this information connected to your main idea or thesis? (Space is left for the user to respond with up to five hundred characters)
Control-X is performed on the information in the space provided.
Control-V is performed to paste the information into the paper at the end of what was previously pasted.
In block 1685 the flow of the paragraph (and transitions with other paragraphs) is checked with instructions to the user. For example:
Text Box refreshes stating:
"Look at your next idea. If your information is in the right order, as it should be, you are ready for a transition. If the information is not in the correct order, you will need to put the quote or information you wish to use after what you have just written.
Yes, my information is in order. I am ready for a transition.
No, I want to use different information after what I just wrote.
User selects "No, I want to use different information after what I just wrote"
"Next" Button is selected
Text Box appears at bottom right corner of screen stating:
"Click here when you are finished reordering your information"
User clicks "OK"
In block 1690, the user's progress is saved, for example:
User clicks "Save" Button
User shuts down word processor in block 1699.
FIG. 17 illustrates an illustrative flow diagram of the progress of a fourth portion 1700 of a historical research paper walkthrough. The fourth portion 1700 begins in block 1705 where a user is selected. For example, a menu drops asking:
Select User
User selects his/her name that has been added to this menu. (Any person that has already used the program can select him/herself, already listed under the select user menu).
In block 1710, continuation information is gathered, for example:
Text Box appears asking:
New Paper
Continue/Edit Paper
User selects "Continue/Edit Paper"
Computer reestablishes all settings from last time user logged off.
In block 1715 the user is presented with transition instructions. For example:
Text Box refreshes stating:
"Look at your next idea. If your information is in the right order, as it should be, you are ready for a transition. If the information is not in the correct order, you will need to put the quote or information you wish to use after what you have just written.

Yes, my information is in order. I am ready for a transition.

No, I want to use different information after what I just wrote.

User selects "Yes, my information is in order. I am ready for a transition"

"Next" Button is selected.

In block 1720 the user is presented with transition selections. For Example:

Text Box appears stating:

"Now it is time to add a transition. Look at your next piece of information. What is the main idea? How do you want to connect what you just wrote to what you want to write next? Once you are ready to connect the ideas together, select OK and the Transitions drop menu will appear. You need to decide if the information in the next paragraph goes in the same direction, a different direction, is a cause or effect of what you just wrote, or is explanatory. Just select the direction you want to go and a list of different transitions will appear. Select one of the transitions, which will get you started.

User selects "OK"

Transition Drop Menu Activated

User selects "Same Direction"

Secondary Drop Menu for Transitions Activated

User selects "In the same vein"

Control-X is performed on "In the same vein."

Control-V is performed to paste "In the same vein" into the paper at the end of what was previously pasted.

In block 1725 the user is presented with space to draft the transition, for example:

Text box appears stating:

"Now you just have to finish the transition"

"In the same vein." Now connect it to the next paragraph

Space is provided up to five hundred characters for the user to type in the rest of the transition.

Control X is performed on the information in the space provided.

Control V is performed to paste the information into the paper at the end of "In the same vein."

In box 1730, the user is presented with remaining options. For example:

User selects "Finish" from control bar

Finish Drop Menu activated with following options:

Compose Introduction

Compose Conclusion

Compose Works Cited Page

Compose Title Page

Compose Dedication Page

Compose Table of Contents

Final Spacing

Check Header/Footer

User selects "Compose Introduction"

In box 1735 the user is presented with introduction options. For example:

Text Box appears stating:

I hate writing introductions. Show me an example.

Walk me through the introduction.

User selects "I hate writing introductions. Show me an example."

"Next" button is selected.

In box 1740 an introduction example (and explanation) is presented to the user. For example:

Text Box appears stating:

"The last step in the actual writing process is to write the introduction and conclusion. This is the most difficult part because it will be the first and last thing that the grader will see. Therefore, you want to start and end well. The basic format for the inverted pyramid is as follows:

(1) Global statement: The history of the United States, and indeed, the world, was changed by Abraham Lincoln's presidency.

(2) Narrower statement: Were it not for the Civil War and the eventual victory of the North, the United States as we know it would not exist.

(3) Narrower statement: Abraham Lincoln orchestrated one whole side of the Civil War.

(4) Narrower statement: Because of this, it is important to examine Abraham Lincoln as a person, in order to better understand all of American history.

(5) Narrower statement: Specifically, Lincoln's parents played a large part in shaping Lincoln's character.

(6) Thesis Statement: Therefore, Lincoln's character, as partially formed by his parents, changed the course of U.S. history by allowing Lincoln the courage to write the Emancipation Proclamation.

I am ready to write the introduction on my own.

Show me other kinds of introductions

Help me write the introduction

User selects "Show me other kinds of introductions"

"Next" is selected.

In box 1745 an alternate introduction example is presented to the user. For example:

Text Box appears stating:

"There are several basic formats for the introduction. The most popular is the inverted pyramid, which goes as follows:

(1) Make a global statement that is really huge. This is not your main point; it is a general truth.

(2) Narrow the statement down until you reach your main thesis. This is something that can be proven in a short paper rather than a book.

Some instructors will prefer if you place all of your main points in the introduction. If so, you have already made all of your main points in the body of the paper. Similarly, the thesis statement will be either the first or the last sentence of the introduction. If you are unsure, ask your instructor what is required.

User selects "OK"

Text Box appears stating:

I hate writing introductions. Show me an example.

Walk me through the introduction.

User selects "Walk me through the introduction"

"Next" button is selected

In box 1750 the user starts walking through the introduction drafting process. For example:

Text Box appears stating:

Inverted Pyramid format

Other format

User selects "Inverted Pyramid format"

"Next" Button is selected

Text Box appears:

Space is provided after each prompt, allowing the user up to five hundred characters to respond:

"Look at the bigger picture. Make a global statement:"

"Narrow this statement down. You want to get a bit closer to your thesis statement:"

"Narrow this down even further:"

"Any more narrowing to do?"

"Thesis Statement:"

User selects "OK"

Control-X is performed on all of the information the user has written.

Control-V is performed, pasting all of the information, each sentence placed in the order in which it was typed, with two spaces between each sentence.

In box 1755 the user is allowed to edit the introduction. For example:
  Text Box appears stating:
  "Do you wish to edit the introduction?
  Yes
  No
  User selects "Yes"
  Text Box appears in lower right corner of screen stating:
  "Click OK when you have finished"
  User clicks "OK."
  In block 1760, the user's progress is saved, for example:
  User clicks "Save" Button
  User shuts down word processor in block 1799.

Figure 18:
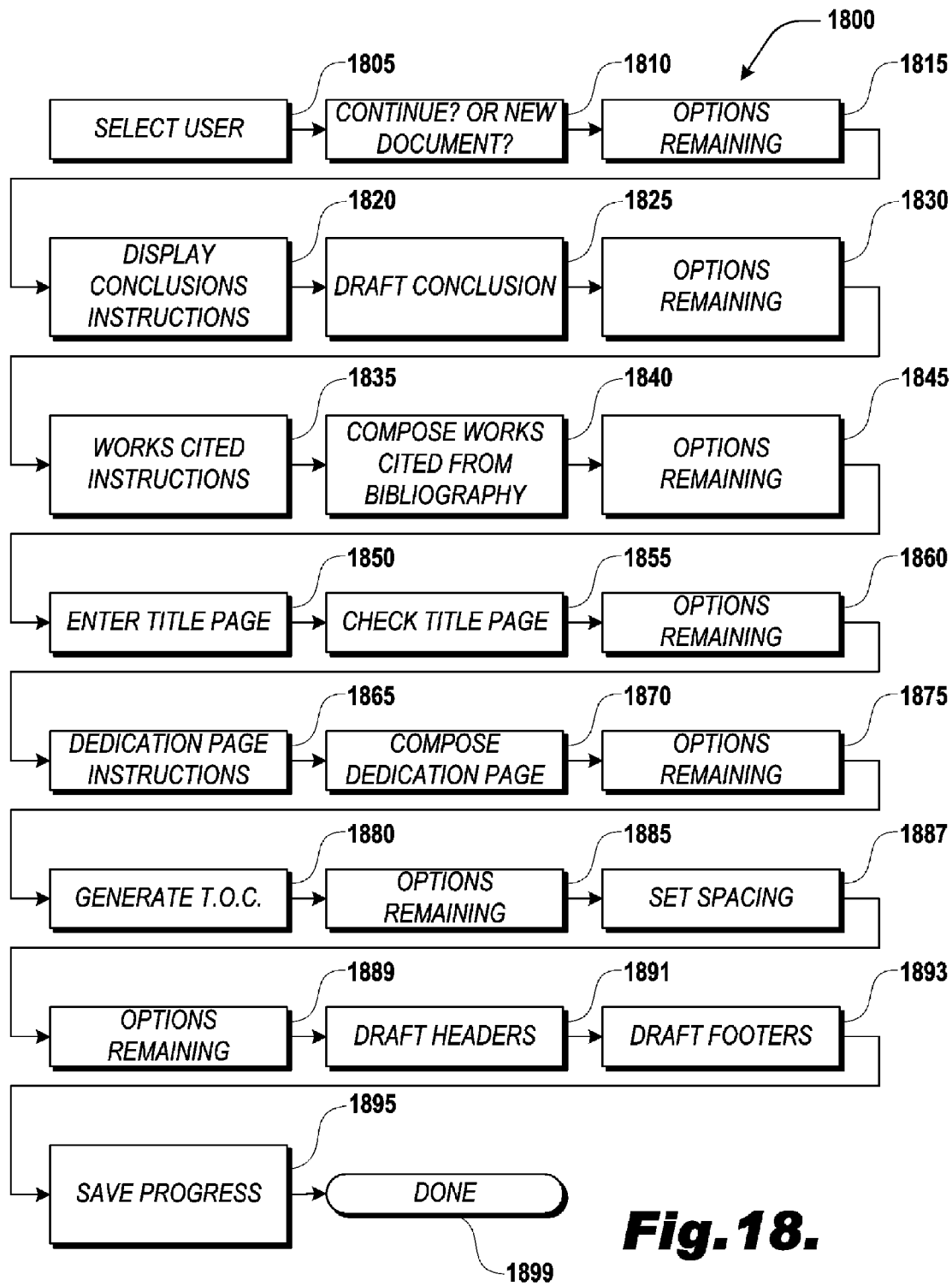

FIG. 18 illustrates an illustrative flow diagram of the progress of a fifth portion 1800 of a historical research paper walkthrough. The fifth portion 1800 begins in block 1805 where a user is selected. For example, a menu drops asking:
  Select User
  User selects his/her name that has been added to this menu. (Any person that has already used the program can select him/herself, already listed under the select user menu).

In block 1810, continuation information is gathered, for example:
  Text Box appears asking:
  New Paper
  Continue/Edit Paper
  User selects "Continue/Edit Paper"
  Computer reestablishes all settings from last time user logged off.

In block 1815, the user is presented with the remaining options for composing the document. For Example:
  User clicks "Finish" on task bar
  Finish Menu appears
  User selects "Compose Conclusion"

In block 1820 the instructions relating to document conclusions are displayed. For example:
  Text Box appears stating:
  This is a tricky part of the paper. Each teacher tends to expect something different from the conclusion. However, there are tried-and-true basic formats.
  (1) Tell them what you already told them in the paper. Some teachers expect you to make your points as you go through the paper. At the end, the instructor simply wants a restatement of your major points. It will then be expected that either the first or the last sentence of the conclusion will be your thesis statement.
  (2) "Open up" your thesis. Restate your thesis and then discuss the implications of your thesis. Expand the idea into other areas and give the reader something more to think about. In other words, tell the reader what it all means and what other conclusions it might lead to.
  (3) Say what you think. If the instructor specifically requests it, put your opinion into the paper. This is one of the rare times that it may be good to use the word "I."
  Hint, Try using the Conclusions button. It can help you get started on your thoughts.

The user then composes the conclusion in block 1825. Next, in block 1830, remaining options are again presented.
  User selects Finish Button
  Finish Button Drop Menu Activated
  User selects Compose Works Cited Page(s)

In block 1835, works cited page instructions are displayed. For example:
  Text Box appears stating:
  "The Works Cited page can be composed for you from the information you already entered for the sources. This page will be in the proper format (MLA, APA, Chicago) that you have already selected, following all spacing and punctuation rules, as well as being alphabetically listed. Select each that is appropriate:
  Compose Works Cited Page
  Add Works Cited Page after last page of text
  Add page number to Works Cited Page
  All options are selected as a default
  User clicks "Next"

In block 1840, the works cited page is composed with all the bibliographic information already entered under Sources.
  The first letter of each citation is analyzed and put in alphabetical order.
  The page is pasted at the end of the paper and the correct page number is added.

Next, in block 1845, remaining options are again presented.
  Text Box appears stating:
  "What do you want to do next?"
  Compose Title Page
  Compose Dedication Page
  Compose Table of Contents
  Final Spacing
  Check Header/Footer
  User selects "Compose Title Page"
  "Next" is selected.

In block 1850, title page instructions are presented. For example:
  Text Box appears stating:
  "Do you want a Title Page or does your instructor prefer that you list the information on the first page of text"
  Title Page
  First Page of text
  If either is selected, the Program will enter the information on the Title Page or first page of text that the user already entered when beginning the paper.

In block 1855 the title page information is checked. If any information is missing:
  Text Box appears stating:
  "You have not entered all the necessary information, please fill out any field that is blank or incomplete. (User is provided with up to two hundred characters per field to fill out the required information)
  Click OK when finished.
  User clicks "OK"

Next, in block 1860, remaining options are again presented.
  Text Box appears stating:
  "What do you want to do next?"
  Compose Dedication Page
  Compose Table of Contents
  Final Spacing
  Check Header/Footer
  User selects "Compose Dedication Page."
  "Next" is selected.

In box 1865, dedication page instruction are presented. For example:
  Text Box appears stating:
  "The Dedication Page is not generally necessary; however, it is a chance for you to dedicate all of your hard work to virtually anything you like. The page appears either directly after the Title Page (if you have one) or directly after the text, but before the Works Cited Page(s).
  Add Dedication Page?
  Yes
  No
  User selects "Yes".
  "Next" Button is selected.

Figure 19:
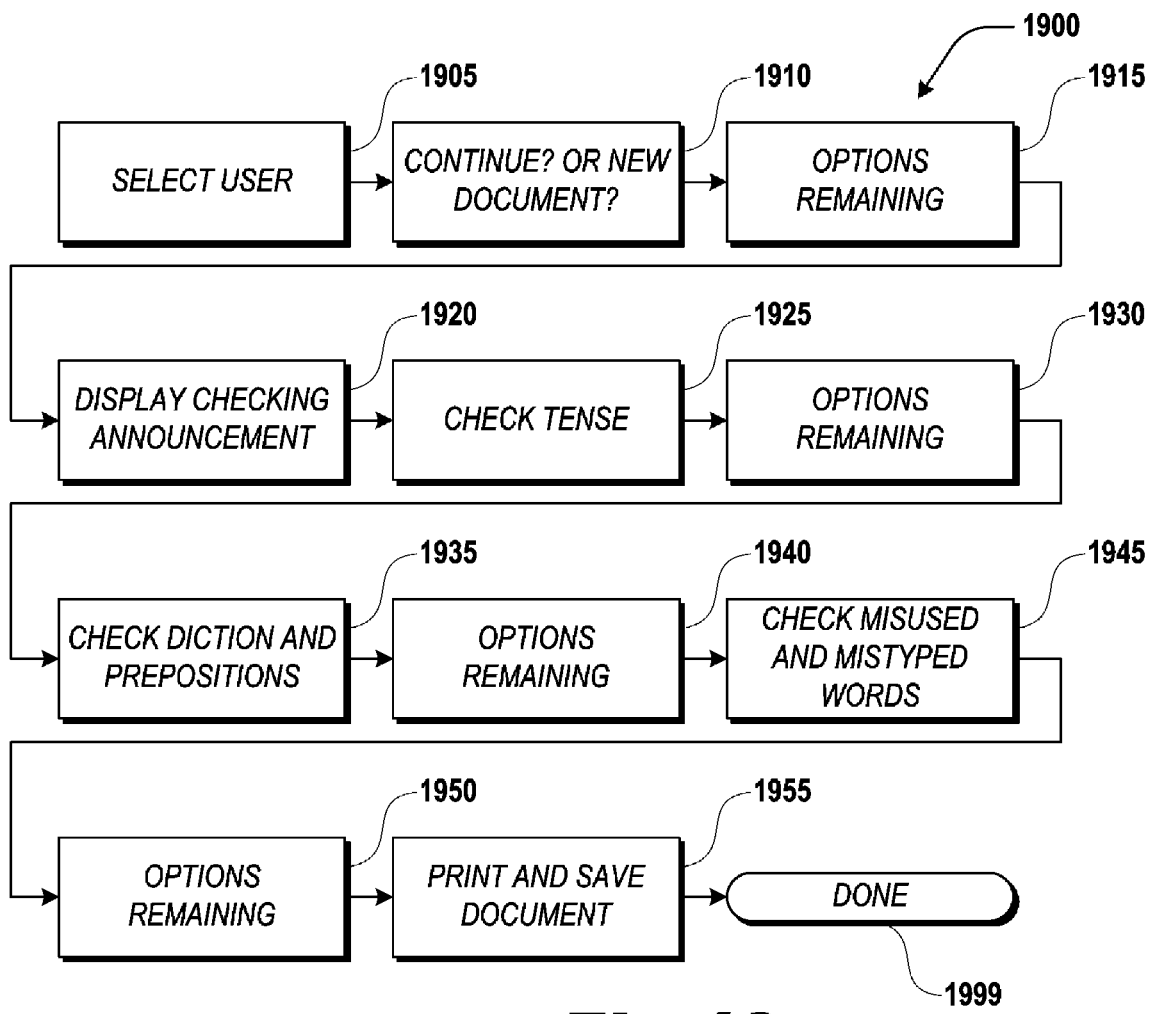

In box 1870 the dedication page is composed. For example:
Text Box appears stating:
"What would you like to say in your dedication? Hint, these pages usually begin with "This work/paper is dedicated to . . . ""
User is left with up to two thousand character to respond.
User selects "OK"
Program cuts and pastes dedication to either a separate page (if there is a title page) or just before the works cited page
Next, in block 1875, remaining options are again presented.
Text Box appears stating:
"What do you want to do next?"
Compose Table of Contents
Final Spacing
Check Header/Footer
User selects "Compose Table of Contents"
"Next" is selected.
In block 1880 the table of contents is composed (e.g., from previously provided information).
Next, in block 1885, remaining options are again presented.
Text Box appears stating:
"What do you want to do next?"
Final Spacing
Check Header/Footer
User selects "Final Spacing"
"Next" is selected.
In block 1887, in one embodiment, the document is automatically formatted as follows:
Anything in quote marks that exceed four lines have the quote marks deleted, are indented ten spaces. These quotes will add extra spaces at the bottom of the current page, if necessary, so that the quote is not separated at the end of a page. These extra spaces will position the long quote to appear on the first line of the next page.
Entire document is double spaced
Next, in block 1889, remaining options are again presented.
Text Box appears stating:
"What do you want to do next?"
Check Header/Footer
User selects "Check Header Footer"
"Next" is selected.
In block 1891, headers are drafted. For example:
Header is opened by the program.
Text Box appears in lower right corner of screen stating:
"Click OK when you have finished creating/editing header"
User clicks "OK."
In block 1893, footers are drafted. For example:
Footer is opened by the program.
Text Box appears in lower right corner of screen stating:
"Click OK when you have finished creating/editing footer"
User clicks "OK"
In block 1895, the user's progress is saved, for example:
User clicks "Save" Button
User shuts down word processor in block 1899.
FIG. 19 illustrates an illustrative flow diagram of the progress of a sixth portion 1900 of a historical research paper walkthrough. The sixth portion 1900 begins in block 1905 where a user is selected. For example, a menu drops asking:
Select User
User selects his/her name that has been added to this menu. (Any person that has already used the program can select him/herself, already listed under the select user menu).

In block 1910, continuation information is gathered, for example:
Text Box appears asking:
New Paper
Continue/Edit Paper
User selects "Continue/Edit Paper"
Computer reestablishes all settings from last time user logged off.
In block 1815, remaining document options are again presented.
Text Box appears stating:
"What do you want to do next?"
Go on to Spelling and Grammar Check
Circle is filled
"Next" button is selected
(This same or similar would happens when user selects "Grammar" Button 1140)
In block 1920, drop Menu 1105 for Spelling and Grammar activated:
Menu Drops with the following options:
Basic Spell Check
Basic Grammar Check
Check Everything
Check Tense
Check Diction and Prepositions
Check Misused/Mistyped Words
Text Box appears stating:
"This program will check for many different forms of writing errors, including basic spelling and grammar mistakes. This means that the program will check for many of the little things for which graders normally deduct points. Click OK to continue.
User clicks "OK"
In block 1925, tense checking is performed. For Example:
User selects "Tense":
Program checks all verbs from a list of all verbs contained in Dictionary Program in Word, WordPerfect and other word processing programs. Each verb will be in the tense specified by the paper type. For example: all history papers must be written entirely in the past tense (other tenses are appropriate only when referring to events that occurred earlier or later than the event currently being discussed). Any verbs that are contained within quotation marks (within 300 characters), provided that the quote marks are both beginning and ending, will be excluded from this function. Similarly, all verbs in a literary paper will be in the present tense (likewise, other tenses are appropriate only when referring to events that occurred earlier or later than the event currently being discussed).
Next, in block 1930, remaining options are again presented.
If user selects Diction and Prepositions, then in block 1935, diction and prepositions are checked. Checking will automatically check all diction and preposition errors from a contained list of diction and preposition errors (e.g., see Appendix F). Should the proper preposition not appear within 100 characters of the word that has a particular preposition attached to it, the word is highlighted and the user is prompted to select the correct usage or ignore the item.
Next, in block 1940, remaining options are again presented.
If the user selects "Check Misused/Mistyped Words", in block 1945 misused and mistyped words are checked. Checking will automatically check all misused or mistyped words from the contained list of misused and mistyped words list (See Appendix F for examples). Should the program detect any words that are frequently misused or mistyped, the spelling and grammar check will highlight the word and ask the user to change usage or ignore.

For example:

Text Box appears stating:

"The program has detected the following possible error:"

You used the word palette which means "a painting surface"

Program then suggests alternative meanings

I really mean:

Pallid—Pale

Pallet—a surface used to stack items for transport, usually by a forklift or skid loader Palate—Of or pertaining to the mouth; the roof of the mouth; one's sense of taste I already know this. Do not remind me of this again.

Buttons on right side of text box: Ignore Once, Replace, Next

User selects Palate

User selects "Replace"

Program copies "palate" from text box and pastes into the document.

Program searches for next error.

Next, in block 1950, remaining options are again presented.

If user selects "Print", then in block 1955 the document is printed and saved. For example:

Text Box appears stating:

"It is a good idea to print the document so you can make sure that your printer is working correctly. It may also help if you see the paper in the format in which your grader will see it. *REMEMBER* There is absolutely no substitute for a good proofreader. This program attempts to correct many of the common mistakes that writers make, but it is impossible to catch and/or correct everything. Get a good writer to proofread your paper to make sure it is exactly what you want to submit."

User shuts down word processor in block 1999.

In assorted embodiments, various type of documents may be composed by a user, and optionally processed in some way by different embodiments, a non-exclusive listing might include documents comprising:

essays;

historical research papers;

literary research papers;

business memoranda;

legal documents; and other documents.

Note that a user device 200 or account might be associated with one or more users (e.g., classmates, schoolmates, club members, coworkers, family members or the like). Accordingly, information may be stored for one or more users, such that the information may be reused in subsequent document compositions (e.g., name, class, school or the like).

In some embodiments, there may be a fee or other financial transaction associated with various steps of composing a document. For example, a user might receive a charge for this service. Such a charge might be automatically billed to a credit card or deducted from a debit card or bank account or prepaid account associated with a particular user, with a user device 200 or with a location.

In addition to text documents, various embodiments provide additional guidance. The additional guidance may be user-specific, or may vary by implementation. For example, scientific documents may include diagrams, figures, captions and tables. In one exemplary embodiment, additional rule sets and user interfaces may be added to accommodate different types of documents.

The document guidance described above may be employed in a myriad of applications in addition to word processors. In various embodiments, they may be employed presentation software, graphical applications of the like.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. For example, Appendices A-H provide various exemplary implementations of aspects of exemplary embodiments. This application is intended to cover any adaptations or variations of the embodiment discussed herein. Therefore, it is manifested and intended that the invention be limited only by the claims and the equivalence thereof.

Appendix A—Research

The first step in any research paper is the research.

Finding a Topic

Choosing a topic is as important as writing the paper itself. Make sure you pick something with which you are at least somewhat familiar. Make sure to get the topic approved by the instructor, or even get your idea from the instructor. Ask the instructor to recommend some books to help you. This is a good way to show the instructor that you are interested, and to make sure that you do not leave out anything that the instructor thinks is important. If you really want some brownie points, see if the instructor has published a book on your subject, or any other related area. Using a quote from the instructor is a great way to get an "A."

If you find that you cannot think of a subject for your paper, just sit down for five minutes in total silence. Think of anything in the class that interests you. After that, make sure that you pick a subject that is narrow enough that people have not written entire books on the subject, but broad enough not to be a statement or paragraph.

The Thesis Statement

Contrary to popular belief, this will not be the first step in your writing process. Instead, you will first find your information and make a rough outline. This will allow you to know exactly how you will organize your paper, and exactly what you can prove. Once you are done with the research, outline and most of the writing, craft your thesis statement carefully.

Gather Your Research

Make sure that you start you research early, in case you need to do interlibrary loans, need to visit other libraries, etc. In addition, it is usually best to do your paper at a leisurely pace, so start as soon as you get the assignment.

After selecting the paper's topic, the toughest work is over; the legwork is just beginning. A good bit of the paper will write itself if you follow your (very rough) outline, which you cannot write until you have the information. Again, contrary to popular belief, drafting an outline is not the next step. In fact, if you follow this guide, much of the silliness that goes along with writing a traditional paper will be eliminated. This guide will show you how to do everything in the correct order and how to get rid of old fashioned techniques like using note cards. For example, it is silly to write a thesis statement before you have any idea what evidence is even available.

Now that you have a pretty good idea of what you want to write about, get an idea of what evidence you want to use. Primary sources are the best sources. In other words, for our example, you would do at least half of your quoting directly from the Gettysburg Address. After this, especially if you are writing a paper about a literary topic, find books that quote experts on the character or book. Encyclopedias, textbooks and quick reference guides (like SparkNotes) are appropriate places to get ideas. Do not quote any of these as a source unless your instructor gives you explicit approval to do so, and you can't find enough decent material elsewhere—which might necessitate a topic change.

The very next step is to head to the easiest research tool ever created, the Internet. Spend some time on the computer and look under a wide variety of key words. If you find it remarkably difficult to find information on the most voluminous information source on the planet, this is probably a major hint that your topic is going to drive you insane. With not much time invested, it might be a good idea to change topics or broaden the scope of your topic. If you find more information than any one human being can digest, you may need to narrow your topic.

With any luck, you have selected an appropriate, narrow topic that actually interests you. Spend some time on the Net and explore the topic. This will give you a chance to get background and information on the topic. Aside from this, you will be able to get most of the information that you can use for the entire paper. Most of the good stuff you find on the Net should either be replaced by what you find in scholarly texts, or at least bolstered by books the instructor approves.

The problem with relying too heavily on the Net is that the Internet is not focused. Let's face it—it is very easy to cut and paste tons of stuff off the Net. But what if it's all garbage? You bought this program to help you write better papers and get better grades. Yeah. That'll require an investment in time on your part—but it is not as if you're being told to hand-copy texts in Latin in a dark monastery. So relax. You never can tell if sources on the Net are accurate, much less written by somebody who has expertise. The Internet, like encyclopedias and textbooks, is a nice place to get ideas, but beware of quoting from any source that does not have an author's name or college attached to it. Really, the best place to begin is in the library (just like they did in the olden days).

When you head to the library, make sure to bring paper, a writing instrument, sticky notes and possibly your palm pilot or laptop computer. Most decent libraries have computerized card catalogs. Do not be afraid to ask the librarians for help. That is why you are paying them. Spend a lot of time on the library computer. It will do most of the work for you. First, write down all the card catalog numbers for the books that appear to be on target. Most libraries are conveniently laid out with similar topics in the same area. Check out all the numbers that you have written down. Most of them will be pretty similar. The point is not just to find particular books that you can use, but also to point you to a specific area of the library where you will take the next step.

Once you get to the area of the library where your books are located, find the actual books that correspond to the numbers you wrote down. Next, find other books on the same and surrounding shelves concerning your topic. Then, it is time to consult the best friend you will ever have: the index. The book's index will tell you exactly where in the book to find the specific information you are seeking. Quickly turn to the relevant pages. If the book appears to contain the information you are looking for, keep it! If not, put it back. Be careful to select books that are not too old. Look at the copyright of the book. You can usually find the copyright date on the back side of the title page. If possible, only keep the books that have been published in the last 15 years or so. The more recent the source, the better it is, unless the librarian indicates that an older book is a "definitive" work or a classic in a particular field.

Now, go back to the computer and look up articles about your topic. This will be a specific search, because the articles themselves will be specific. The books were your general search. Articles will be found in the periodicals section. Bring money and make photocopies of the relevant articles. This is really important: write down all of your source information before you leave the library. This way, you will not have to go back and find your sources again. If you do not have the latest copy of your word processing program (which will put all your citations in correct format both within the paper and on the works cited page) get a copy of the MLA—or other documentation style—handbook, or ask for a sheet outlining correct documentation to find out what specific information on sources you need. Nearly all college and high school libraries will have a copy of this type of document at the front desk. This information is also available online. Write down the author's name, editor's name, city of publication, publisher, year, journal or collected works title, issue, volume, page numbers and anything else that might be relevant. The Paper Writer's Guide program will then make sure your documentation is perfect. Make sure to write down this information even for articles or books you are not yet sure if you want to use. It is better to have too much documentation and not need it rather than to get back to your room and realize the instructor said to use at least eight sources when you only have six. Having perfect documentation will keep you from losing points. More importantly, this will get you free points from the instructor who will probably be impressed.

If you have a palm pilot with handwriting recognition software, you may take your notes at the library and then simply go home and import them into your word processing program. You may also bring a laptop to the library and take your notes at the library. In this way, rather than taking notes by hand later and wasting time typing them into the computer, you can finish both steps at once.

Unless you are in a big hurry, take a break. All of the library work should be done.

Appendix B—Research Helper

For each source, enter the following information. The information will be stored by the program and will auto-format your bibliography under the "Sources" tab:

Book
Author's last name
Author's first name
Author's middle initial
Title of book
City of publication
Publisher
Year of publication
Book with More than One Author
First author's last name
First author's first name
First author's middle initial
Second author's first name
Second author's last name
Second author's middle initial
(etc.)
Title of book
Publisher
City of publication
Year of publication
Book with No Author
Title of book
City of publication
Publisher
Year of publication
Anthology or Compilation
Editor's last name Editor's first name
Editor's middle initial
Title of anthology/compilation
City of publication
Publisher
Year of publication
Work Within an Anthology
Article author's last name
Article author's first name
Article author's middle initial
Title of article
Title of anthology
Editor's first name
Editor's last name
City of publication
Publisher
Year of publication
Page numbers
Article from a Professional or Scholarly Journal
Author's last name
Author's first name
Author's middle initial
Title of article
Title of journal
Edition or issue
Page numbers
Article from a Magazine
Author's last name
Author's first name
Author's middle initial
Title of journal
Title of article
City of publication
Publisher
Year of publication
Page numbers
Edition
Newspaper Article
Author's last name
Author's first name
Author's middle initial
Title of article
Name of newspaper
Day
Month
Year
Section number
Page number
Reference Book Article
Title of article
Title of reference book
Edition number
Year of publication
Internet Source with Author and Article Title
Author's last name
Author's first name
Author's middle initial
Title of site of article
Year of publication
Day month year accessed
Internet address
Internet Source with Only Author
Author's last name
Author's first name
Author's middle initial
Year of publication
Day month year accessed
Internet address
Internet Source with Only Title
Title of site or article
Year of publication
Day month year accessed
Internet address
Internet Source with Only Internet Address
Internet address
Year of publication
Day month year site was accessed Appendix C—Research Paper Guide
How to Write a Research Paper: Liberal Arts, Sociology, History, Literature, etc.
Paper Formats:
INFORMATIVE PAPER: This paper only wishes to inform the reader.
PERSUASIVE PAPER: This paper seeks to prove a point.
COMPARE AND CONTRAST: Comparing means that two concepts are the same. Contrasting means that two ideas are different.
CREATIVE WRITING: This is a whole different type of paper, which generally does not require you to use sources. However, you can still use your word processing program to format your paper to fit MLA or other guidelines.
Research: (SEE Appendix A—Research)
Organizing Your Information
Once you have the sources, you have to be able to use them effectively. That means you need to have quotes. There is no proof in a high school or college paper without first having quotes and sources from people who have dedicated their lives to the particular subject you are writing about.
In this stage, you will need some sticky notes. The research phase is really about narrowing your ideas and the sources of information even further. To get information out of a book, first look at the table of contents. If there is an entire chapter on the information you want, then you might want to read that chapter. However, it is generally more fruitful to go to the index. Look through the entire index for anything that catches your eye that might be a good place to find some information. Write the page numbers down on the sticky note. When you are done, put the sticky note inside the front cover of the book and go onto the next source. With any articles that you photocopied, the process will be even simpler. Just highlight any information that you think you can use. This part of the research should not take that long, so you might want to just go ahead to the next step of actually gathering the information that you need.
Gathering information from books is really simple and can be done in two ways. The first way is old-fashioned, but effective. Get a sheet of paper and write the name of the author and the book at the top of the page. Go through all the pages that you wrote down on the sticky note. At each page, skim through until you find something that you might be able to use. (This means really anything that could further your idea—it is better to have too much information than have to go back and get more later when you are actually writing). Write down all of the information from that author that might be useful making sure to write down the page number after each piece of information or quote. Some people are not sure what they need to cite. The basic idea is this: if it is not common knowledge or, in any way, it is not your original idea, cite it. It is better to cite something you might not need to than get stuck with a charge of plagiarism.

Repeat this same process with every book. In a short period of time, you should have several pieces of information, all organized by author.

The second method is to type the information directly into the computer. Follow the same procedure, putting all quotes and information under the name of the author and the title of the book, making absolutely sure to type in the page numbers. Print out the information so you can organize it in a rough outline.

Types of Proof
(1) Primary sources. A primary source is anything that comes directly from an author who wrote the original work. In other words, you would quote directly from *The Great Gatsby* rather than from a critic who wrote something about the book or F. Scott Fitzgerald. These are the best sources and, if at all possible, use these direct sources.
(2) Secondary sources. Anything that is a historical fact, an expert comment, or does not come from a primary source (the original author's work).
(3) There are many types of proof. These are some of the most common and accepted ways that people try to prove their points.

Using examples
Analogies (comparing two things in a definitional way, though they may not at first seem to be related)
Use of historical facts
Comparing or contrasting two ideas or facts
Using expert statements
Internet citations
Encyclopedia citations (Ask your instructor before you use these at the high school level or beyond. Many people do not approve of encyclopedias for use in a paper at the high school level or beyond.)

Making the Outline

You must be able to link specific pieces of information to your idea. You start with a general idea, but you need quotes and sources to support that information. In addition, you must decide how to link your ideas in the outline. These ideas are just as good for devising your outline as for coming up with ways to explain your ideas.

Cover the history of your topic and what it means to the present
Examine the background of a writer and how it affected his or her literature.
Fit your idea into a bigger literary/historical/sociological sense
The logical approach—each idea must lead to the next conclusion
Criticize the critics. Find out what the experts say and analyze it.

By now, you should have all the information that you need to write the paper. The key to success is to make sure that your information is organized correctly. The best way to organize is to come up with a rough outline. Look through your information. With the information, you know exactly what you can prove. Now, you just have to present it in a way that the instructor will like.

Think of the major points that you want to get across. For most papers, you should have no more than one or two major points per page. For example, a six-page paper should have somewhere between six and twelve major points. List the points that you want to make.

Look at the points and figure out the order in which you want to make them. Write them down in that order and number them with Roman numerals, leaving several spaces between each line. The first Roman numeral should be your introduction and the last should be your conclusion. You may type this information into the computer or write it down on a piece of paper. Now, put any supporting information underneath the major point that it fits best with. These can be labeled with letters.

Now you know the form that your paper is to take. If you have not done so already, type the outline into the computer.

If you are doing things the old-fashioned way, all of your quotes will be written down on pieces of paper under the author and title headings. Now, you will be making a series of decisions. You must decide under which heading each piece of information belongs. With the outline in front of you, put a Roman numeral next to each piece of information, assigning it to a spot on the outline. Now, it is time for the paper to write itself.

If you have typed the quotes and information into the computer already, you will have to cut and paste the information into your outline. If you have written the information on pieces of paper, you will simply type them into the outline at the appropriate place.

This is really the simplicity of the system. Once the quotes are in the computer in the order in which they will appear, the only thing you have to do is connect the quotes. The connection of quotes is in a standardized format to make everything as easy as possible.

Thesis Statement

Finally, you should have all your information together. Now that you know what you can prove, you can write a decent thesis statement. The thesis statement should state your topic and whatever it is you are trying to prove in the paper. If you are interested in Lincoln, it would be unwise to have a thesis statement such as: "Lincoln was the greatest American president." This topic is broad enough for a thick book. However, this is a terrific place to begin. At this point, go to the Internet and do a search on your topic. This will allow you to see how much is written about a particular subject. Now, you can narrow the same subject down to a territory that is manageable. For example: "Lincoln was a terrific politician." This is still too broad, but it is getting better. Now, try to focus on a specific incident in which a good deal is written. You could write: "Lincoln's Gettysburg Address was a speech successfully calculated to inspire the Union to continue the war effort." Finally, you have reached a good thesis statement. This statement is narrow enough for a paper, but, as you already know, you will still be able to find lots of information on this topic.

The Format

For each quote, you will make a point. The quote itself is the proof; it is not the point. (Bonus: this will also serve as a tutorial on how to use a quote.)

Decide how the quote is going to help prove your point. Then:
(1) Introduce the quote
(2) Give the quote
(3) Explain the quote and how it ties to the main idea
(4) Transition to the next idea and quote The main idea is to take nothing for granted. Never assume that your reader knows anything, unless your teacher tells you to do so. Keep answering the following questions:

Why is this piece of information important?
How does it relate to your thesis statement?
Is there a chronological order that you should point out?
Does this idea relate to anything else?

When in doubt, try to keep your sentences short. Do not use a bunch of long sentences connected with the word "and." You need to explain everything as much as possible and make sure to transition between ideas. These types of transitions can be made with the transition button, or, if you are making a solid point, with the conclusion button. Remember, make connections between each point and make all of the connections obvious, because the connection may only be obvious to you, not the reader.

Word Processing Integration Features

Research Paper

There is a button on the power bar labeled RESEARCH PAPER. Click this button at any point of your writing. The Paper Writer's Guide program will prompt you to enter your last name at the beginning of writing your paper. The word processing program will then automatically add page numbers to every page.

In addition, the program will ask you what margins you would like. MLA format, for example, is to have one-inch margins all the way around the page.

Sources

When you type in each quote, click on the SOURCE BUTTON. Click on New Source. The program will ask you if you wish to have all of your sources in MLA, Chicago or APA format. All quotes entered into that particular paper will be under that same format. The program will prompt you to enter the author's name and will ask you for all the required bibliographical information. You will then be asked to enter the page number. The program will then put the information into the paper for you, in correct MLA, Chicago or APA format. That particular source will then be added to the drop menu. If you want to use that same author, click on the author's name. The program will then prompt you to enter a page number, again entering the cite onto your page in the correct format. Thereafter, the word processing program will automatically compile your Works Cited page in the correct format. This page will print out at the end of your document, along with the corresponding page number.

Anything within quote marks that goes over four lines will automatically be put into the correct format by the word processing program. The program will indent ten spaces on the left and double space the quote.

Transitions

This is the point where the Paper Writer's Guide can save your bacon. The only question is whether to put the transition at the end of the paragraph, or use it as an introduction to the next point. This decision is a matter of preference. Therefore, ask your teacher/professor which method is preferred. However, transitions, like organization, are the two areas of a paper that most writers have the most trouble with. Therefore, use the word processing program button on the power bar labeled "TRANSITIONS" and a drop menu will appear. The menu will first ask if the two quotes you are using will be going in the same direction, different direction, are cause and effect, or are explanatory. Then, a secondary drop menu will appear with a list of the type of transitions requested. Do not use the same transitions over and over in the same paper. Like anyone else, the person grading the paper does not like to get bored.

Conclusion Button

This button will have a list of ways to make your points. Remember, some teachers prefer that you say that things suggest, infer, imply, lead to the conclusion, rather than that something "definitely" means something. This button will provide you with a list of ways that you can make your point by immediately pasting remarks into your paper.

Introduction

The last step in the actual writing process is to write the introduction and conclusion. This is the most difficult part because it will be the first and last thing that the grader will see. Therefore, you want to start and end well.

There are several basic formats for the introduction. The most popular is the

Inverted Pyramid.

(1) Make a global statement that is really huge. This is not your main point; it is a general truth.

(2) Narrow the statement down until you reach your main thesis. This is something that can be proven in a short paper rather than a book.

Other Introductions

Some instructors will prefer if you place all of your main points in the introduction. Similarly, the thesis statement will be either the first or the last sentence of the introduction.

Conclusion

This is a tricky part of the paper. Each teacher tends to expect something different from the conclusion. However, there are tried-and-true basic formats.

Tell them what you already told them in the paper. Some teachers expect you to make your points as you go through the paper. At the end, the instructor simply wants a restatement of your major points. It will then be expected that either the first or the last sentence of the conclusion will be your thesis statement.

"Open up" your thesis. Restate your thesis and then discuss the implications of your thesis. Expand the idea into other areas and give the reader something more to think about. In other words, tell the reader what it all means and what other conclusions it might lead to.

Say what you think. If the instructor specifically requests it, put your opinion into the paper. This is one of the rare times that it is good to use the word "I."

General Rules

Never use the words "I" or "you" in a formal paper

No contractions in a formal paper

Always use transitions

A semicolon is only used to separate two complete sentences

Be specific. The only global statements should be used in the introduction and conclusion. These are also the only places where the word "I" can be used, and used only if you are being asked for your opinion in the paper requirements.

When in doubt about anything, ask the instructor for advice. A little brown-nosing is good for the grade.

For the most part, keep everything simple. If you can, break everything into short sentences, especially for high school papers. Use your common sense. If you are capable of more complex writing and your instructor expects it from you, do not oversimplify your language. However, do not try to "dress up" your paper with a bunch of fancy words. The thesaurus is to help you find the right word, not find a word you do not understand, which you might use incorrectly anyway.

Always write everything in single-spaced format. Because of the limited space on the screen, it is easier to see where you are coming from and where you are going. Later, when you hit the finish button, it will automatically space the document according to the documentation format you have chosen.

Repetition is bad. Do not restate your points unless it is absolutely necessary in order to connect two ideas. The only places where you can usually repeat are in the conclusion. Instead of writing something a second time (for example, when you need to make the paper longer), just explain more and make sure that what you have said is easy to understand.

Appendix D—Brief Checklist for Document Writing
  Getting an Idea
  Brainstorm if you need.
  Go to the Internet to get ideas.
  Research
  (1) Internet: Topic Search, Author Search, Try Different Search Engines.
  (2) Encyclopedia: Get some general ideas.
  (3) Library: Bring writing instrument, paper, sticky notes, laptop or palm pilot (if you have one).
  Go to the Computerized Catalog and spend time there.
  Look under the Subject, Author, and Person.
  Make sure to look under all related fields.
  Look for specific texts.
  Look for areas of the library to investigate.
  Look up and down the shelves for all related texts and get them off the shelf.
  Look through the table of contents and index of each book.
  Keep the books that have lots of information about your topic and get rid of the others, unless you need to pad your sources.
  Padding your sources: Grab a quick quote or piece of information from the book, write down its bibliography and put the book back on the shelf.
  Check out the books you are actually going to use.
  Write down the Bibliography for all your texts IMMEDIATELY.
  Alternative: Take notes at library on palm pilot, laptop, or paper and pencil.
  Library Search for Journal Articles.
  Search through the library's Database for journals.
  Search under various (related) titles, authors, subjects.
  Write down Bibliography IMMEDIATELY.
  Scholarly and Not-As-Scholarly Journals: Scholarly journals are written for professionals. Not-As-Scholarly journals do not specialize and can generally be found at the grocery checkout line or at a newsstand.
  Taking Notes: (at home or library, may be done with palm pilot or laptop).
  (1) Get Sticky Notes, and either note cards or paper (legal pads are great).
  (2) Look through the index of each book and write down the relevant page numbers on your sticky notes.
  (3) Complete the index search for each book. Do not read the books, but you have to read the journal articles.
  (4) Start Taking notes out of one book at a time, using the sticky notes to guide your search.
  Notecards vs. Paper
  If you use notecards, put a symbol at the top of each card so you can remember which author wrote the book your quote or information came from.
  If you use paper, write the name of the author at the top of the page.
  Do not put info from two authors on the same sheet of paper.
  Either way, make sure you write down the page numbers IMMEDIATELY after each note you take.
  By now, you should have a really good idea about what you can actually write about.
  Make a really quick outline about the ideas you have. This will help you direct your quest for quotes.
  Quotes and Citations
  Any information that is not yours must be credited to the author that you take the information from. This includes background information, direct quotes, ideas, etc. Literally, anything that is not yours must be attributed to the source from which you stole it.
  Each piece of information should be directed to the topic and be able to help you prove some type of thesis.

Appendix E—Checklist for Organizing Information
  Organizing the Information:
  (1) Take a look back through your notes and see the patterns that develop.
  (2) You should be able to make a general outline by now.
  (3) Take the major ideas and see how they flow together.
  (4) Write another outline, this time with more detail and group your ideas together so that they lead to the conclusion.
  Example:
  I. Background
  II. Theory on Racism
  III. How Background Affected Theory on Racism
  IV. Conclusion
  Now add detail to the outline and fill in each of the Roman numerals.
  It should be relatively easy to see which Roman numeral under which each subcategory fits.
  Spend time on the outline. Organizing the outline saves a bunch of editing time later.
  Organizing the Information
  (1) Assign a normal or Roman Numeral to each piece of information.
  (2) Go through all of your notes and put all info into categories.
  RESEARCH PAPER. You will immediately be prompted to select a documentation style (MLA, Chicago or APA). You will be asked your last name, which will be added to all page numbers.
  Once you know where each quote goes, type the outline into the computer.
  All of your information should be organized by author, not by category
  (1) Type in all the quotes from each author.
  (2) Click on the SOURCE button. You will be prompted to enter the author's name and all the information that will be needed to complete the Works Cited page and put the citation into the paper correctly. Thereafter, simply click on the Source Menu and the authors will be listed alphabetically. Click on the author you wish to use and then simply enter the page number of the citation. The source will automatically be listed in the paper.
  (3) Go to the next quote and type it under the relevant category. With this method, you will not have to keep typing the author's name. Now, all of the information should be in the computer and be neatly organized into categories.
  Finally, it is actually time to write! It is usually helpful to write a brief introduction.
  The Introduction and Conclusion:
  Write a brief introduction with the points that you wish to make in the paper.
  Write a temporary thesis statement.
  Paste this information at the (beginning and) end of the paper. This will probably be the basis for your conclusion (and introduction).

APPENDIX F

Table of Commonly Misused Words

| COMMONLY MISUSED WORD | WORD FOR WHICH IT'S MISTAKEN | DEFINITION OF WORD IN COLUMN 1 |
|---|---|---|
| accept | except | to agree |
| aggravate | irritate | to make worse |
| allude | elude | to make reference to something |
| allusion | illusion | making reference to something |
| borrow | take | bring it to me |
| bring | lend | give it to me |
| Calvary | cavalry | the place where Jesus was crucified |
| cavalry | Calvary | horses |
| complaint | compliant | a gripe |
| compliant | complaint | going along with |
| complement | compliment | to complete |
| compliment | complement | to say something nice |
| elude | allude | to get away, or difficult to understand |
| emigrate | immigrate | to leave a country |
| eminent | imminent | important |
| except | accept | to not include |
| farther | further | a measure of distance |
| figuratively | literally | not literally true |
| further | farther | a different degree, to move in a non-measurable way |
| illusion | allusion | ghostly image |
| immigrate | emigrate | to come into a country |
| imminent | eminent | about to happen |
| incredible | incredulous | amazing |
| incredulous | incredible | a human reaction to something amazing |
| intelligent | intelligible | smart |
| intelligible | intelligent | easily understood |
| irritate | aggravate | to annoy |
| its | it's | [possessive] |
| it's | its | it is |
| lead | led | a soft metal, or to be in the front |
| led | lead | to have gone somewhere |
| lend | borrow | I'll give it to you |
| literally | figuratively | something that actually is true |
| loose | lose | not tight |
| lose | loose | cannot locate |
| medal | metal, meddle | an award |
| meddle | medal, metal | to interfere |
| metal | medal, meddle | steel, iron |
| persecute | prosecute | to harass |
| prescribe | proscribe | to give or recommend |
| principal | principle | school guy or of utmost importance |
| principle | principal | a concept or idea |
| proscribe | prescribe | to forbid |
| prosecute | persecute | to bring criminal charges against, or to pursue |
| stationary | stationery | not moving |
| stationery | stationary | writing paper |
| take | bring | take it away from me |
| than | then | a comparison word |
| their | there, they're | [possessive] |
| then | than | refers to time |
| there | their, they're | a place |
| they're | their, there | they are |
| use | used to | to do something [with an object] |
| used to | use | to become accustomed to something |
| vain | vein | arrogant |
| vein | vain | where blood flows, or in the same style |
| your | you're | [possessive] |
| you're | your | you are |

Appendix G—History Paper Walk through
 User selects "Research Paper"
 Menu drops asking:
 Select User
 New User Selected (Any person that has already used the program can select him/herself, already listed under the select user menu).
 Text Box appears asking questions, each question with a space for the user to answer:
 First Name
 Middle Name
 Last Name
 "Next" button appears at bottom
 "Next" button selected
 Textbox refreshes
 Select Level of Education:
 Middle School (applies normal MLA standards)
 High School (applies normal MLA standards)
 College (applies normal MLA standards)
 Graduate School (applies graduate MLA standards)
 "High School" Selected
 "Next" Button Selected
 Menu drops asking:
 Research Paper
 Essay
 Selecting puts "dot" in circle
 "Research Paper" selected
 Text box appears asking:
 "What type of paper?"
 History
 Literature
 Creative
 Other
 "History" is selected
 "Next" button is selected
 Text Box refreshes
 "What specific category of paper?"
 Informative
 Persuasive
 Compare and Contrast
 Other
 "Informative" is selected
 "Next" Button is selected
 Text Box appears asking questions, each question with a space for the user to answer:
 Title of Paper (if known)
 Name of Class
 Instructor's Name
 Date Due
 (This information is stored in the files memory to be used in compiling the title page or opening title, if the user chooses to put the information on the top left of the first page.)
 "Next" is selected
 Text Box Refreshes asking:
 Length of Paper?
 paragraphs
 Word Count
 Pages
 "Pages" is selected
 "Next" Button is selected
 Text Box Refreshes asking a question with a space provided for the answer:
 Number of Pages?
 "5" is entered.

"Next" Button is selected
Text Box appears stating:
"History papers should be written in the past tense, past perfect tense or future perfect tense, with the exception of information appearing in quotes."
Check box at bottom of text box states:
"Don't remind me of this again"
"Don't remind me of this again" is selected
"Next" Button is selected
Text Box appears stating:
"Literature papers should be written in the present tense, past perfect tense (for events that happened earlier in the literary text), or future perfect tense (for events that will happen later in the literary text), with the exception of information appearing in quotes."
Check box at bottom of text box states:
"Don't remind me of this again"
"Don't remind me of this again" is selected
"Next" Button is selected
Text Box appears stating:
"it is time to do some research. Would you like to start now?"
Yes
No
"Yes" is selected
Text Box appears asking:
"Would you like to view the Research Checklist?"
Yes
No
"Yes" is selected
Checklist appears as a separate document as follows:
(See Appendix D)
Text Box appears in lower right of screen asking:
Print
Close this document
I know how to do research. Don't show me this again.
User clicks "Save" Button
User shuts down word processor
Next Day
User restarts word processor
"Research Paper" is selected
Menu drops asking:
Select User
User selects his/her name that has been added to this menu
"His Name" is selected
Text Box appears asking:
New Paper
Continue/Edit Paper
User selects "Continue/Edit Paper"
Computer reestablishes all settings from last time user logged off
Text Box appears asking:
"Enter Source Information Now?"
Yes
No
User selects "Yes"
Text Box appears asking:
"What type of documentation style?"
MLA (This is the format that most high schools and colleges require)
APA
Chicago
MLA selected
"Next" Button is selected
Text Box appears:
"You will be asked to select different types of sources and then enter all the information needed. The information you enter will automatically be configured into proper documentation format and the program can then put your works cited page together.
Each time you add a new source, the program will add the source to the "Sources" drop menu
If you click the "Sources" button, the author's name or the name you have assigned to the citation will appear in the drop menu.
When you select the source you want, you will be asked for the page number.
This information will then be added to your paper at the last cursor position."
Add bibliographic information now
Remind me later
User selects "Add bibliographic information now.
"Next" button is selected
Text Box appears asking:
"Organize your information now?
Yes
No
User Selects "Yes"
Text Box appears asking:
"Would you like to view information on organizing your information?"
Yes
No
"Yes" is selected
Checklist appears as a separate document as follows:
(See Appendix E)
Text Box appears stating:
Type the outline into the computer, leaving several spaces between each entry
User clicks "OK" at bottom of Text Box
Text Box appears in bottom right corner of screen stating:
"Click OK when you have entered your outline"
User clicks "OK" button
Text Box appears stating:
"It is time to enter all of the quotes and other pieces of information you have. After you enter each piece of information and hit the RETURN key, you will be prompted to select a source from your Source menu. Simply enter the page number, if known, and the citation will be added after your quote or piece of information"
Start now
I'll start later
User selects "Start Now"
"Next" is selected
Text box appears in bottom right corner of screen stating:
"Click OK when you have finished entering all of your information"
User selects "OK" button
Text Box appears stating:
"Finally, it is actually time to write! It is generally best to write the body of the paper first, leaving the introduction and conclusion until last. Select from the following options:"
Write Introduction
Write Body
Write Conclusion
"Click OK to begin"
User selects "Write Body"
User clicks "OK" button
Text Box appears (in lower right corner) stating:
"Make sure your information and quotes are in the order in which you wish to use them"
Yes they are
User clicks "OK"

Text Box appears stating:
"Are you familiar with the easiest way to write a paper?"
Show me the method
I have already been through the tutorial and know the method
I know this method well, don't show me this again
User selects "Show me the method"
"Next" button is selected
Text Box appears stating:
The Writing
Hook all of the quotes together in the outline you have laid out using this FORMAT:
(1) Introduce the quote
(2) Give the quote
(3) Explain the quote and how it relates to your thesis/main ideas
(4) Transition to the next idea
Remember: Take nothing for granted. Never assume the reader knows anything. Answer the questions:
(1) Why is this piece of information important?
(2) How does it relate to your thesis statement?
(3) Is there a chronological order that you should point out?
(4) Does this idea relate to anything else?
I would like guidance as I write the paper
I know this method and do not need any guidance
User selects "I would like guidance as I write the paper"
"Next" button is selected
Text Box appears stating:
"Put your cursor at the beginning of the first quote you want to write information for. For example: if your first quote is "Abraham Lincoln lived in Illinois", put the cursor right before the quotation marks in front of Abe Lincoln's name. Click OK to continue"
User clicks "OK"
Text Box appears at bottom right of screen stating:
"Click OK when your cursor is where you want it"
User clicks "OK"
Text Box appears stating:
"Look at the quote or piece of information. You need to introduce this information. What is the main point that you are trying to make about this piece of information?"
(Space is left for the user to type up to three hundred characters)
"When you are finished, click OK"
User clicks "OK"
Information user typed into Text Box is selected. Control X is performed. Control V is performed and the information is pasted in front of the last cursor position, leaving two spaces before the cursor position.
Text Box appears asking:
"Do any other quotes or pieces of information need to be put into this paragraph?"
Yes, I will place the information there myself
No, I am ready to finish the paragraph and go onto the next paragraph
I don't know, show me an example
User selects "I don't know, show me an example"
"Next" button is selected
Large Text Box appears stating:
"Many times, when people are writing papers, certain small pieces of information do not give enough information to form an entire paragraph. For example: many people like to add biographical or background information all in one shot near the beginning of a paper. If you were writing a paper about Abraham Lincoln and wanted to include information about his upbringing, it might go something like this:

Introduce the quote(s) or piece(s) of information: Abraham Lincoln's background is very important to understanding the decisions that he made as president.
Now you need to add several pieces of information. If they are from the same author, you can simply give all of the information and put a single source at the end.
You can add: Lincoln was born in Tennessee to a father who he despised and a mother who was rather cold. This was a rocky start for the future president. By the time he moved to Illinois, Lincoln was a highly independent thinker. This suited him well in the legal profession (Smith 22-24).
If all of this information came from one source, you can simply click the Source button, select the source and add the page numbers. The program will paste this information into the paper for you.
Thereafter, you still need to explain the information and provide a transition."
Click OK to continue
User clicks "OK"
Previous Text Box appears asking:
"Do any other quotes or pieces of information need to be put into this paragraph?"
Yes, I will place the information there myself
No, I am ready to finish the paragraph and go onto the next paragraph
I don't know, show me an example
User selects "I will place the information there myself"
"Next" button is selected
Text box appears at bottom right of screen stating:
"Click OK when you have all your information together"
User clicks "OK"
Text Box appears asking:
"Do the pieces of information you used flow together?"
Yes, continue
No, I need help
User selects "No, I need help"
"Next" Button is selected
Text Box appears stating:
"All you have to do is put a connection between the pieces of information. For example, if you know that you want to put these two pieces of information together: "Lincoln read a great many books as a young man" and Lincoln became a lawyer, you can simply add the connection between them that makes the two flow together. For example: "Lincoln read a great many books as a young man," and perhaps because of his love for history and politics, Lincoln became a lawyer (Smith 23).
Click "OK" to continue
User clicks "OK"
Text Box appears asking:
"Do the pieces of information you used flow together?"
Yes, continue
No, I need help
User selects "Yes"
"Next" Button is selected
Text Box appears stating:
"You must tell exactly what the quote means. Do not take it for granted that the quote explains itself"
Explain the quote: (Space is left for the user to respond with up to five hundred characters)
Hint, you can use the Conclusions button to start sentences when you are explaining.
Would you like to use the Conclusions Button?
Yes
Click OK when finished
User clicks "OK"

Control-X (cut) is performed on the information in the space provided.

Control-V (paste) is performed to paste the information into the paper at the end of the quotes and other pieces of information that the user entered previously If user selects Conclusions button, conclusions drop menu is activated. Whatever user selects from drop menu is copied from the menu and pasted into the space left for the user to respond with up to five hundred characters as the previous text box refreshes.

Text Box refreshes stating:

How is this information connected to your main idea or thesis? (Space is left for the user to respond with up to five hundred characters)

Control-X is performed on the information in the space provided.

Control-V is performed to paste the information into the paper at the end of what was previously pasted.

Text Box refreshes stating:

"Look at your next idea. If your information is in the right order, as it should be, you are ready for a transition. If the information is not in the correct order, you will need to put the quote or information you wish to use after what you have just written.

Yes, my information is in order. I am ready for a transition.
    No, I want to use different information after what I just wrote.

User selects "No, I want to use different information after what I just wrote"

"Next" Button is selected

Text Box appears at bottom right corner of screen stating:

"Click here when you are finished reordering your information"

User clicks "OK"

Text Box refreshes stating:

"Look at your next idea. If your information is in the right order, as it should be, you are ready for a transition. If the information is not in the correct order, you will need to put the quote or information you wish to use after what you have just written.

Yes, my information is in order. I am ready for a transition.
    No, I want to use different information after what I just wrote.

User selects "Yes, my information is in order. I am ready for a transition"

"Next" Button is selected

Text Box appears stating:

"Now it is time to add a transition. Look at your next piece of information. What is the main idea? How do you want to connect what you just wrote to what you want to write next? Once you are ready to connect the ideas together, select OK and the Transitions drop menu will appear. You need to decide if the information in the next paragraph goes in the same direction, a different direction, is a cause or effect of what you just wrote, or is explanatory. Just select the direction you want to go and a list of different transitions will appear. Select one of the transitions, which will get you started.

User selects "OK"

Transition Drop Menu Activated

User selects "Same Direction"

Secondary Drop Menu for Transitions Activated

User selects "In the same vein"

Control-X is performed on "In the same vein."

Control-V is performed to paste "In the same vein" into the paper at the end of what was previously pasted.

Text box appears stating:

"Now you just have to finish the transition"

"in the same vein." Now connect it to the next paragraph

Space is provided up to five hundred characters for the user to type in the rest of the transition.

Control X is performed on the information in the space provided.

Control V is performed to paste the information into the paper at the end of "In the same vein."

Text Box appears stating:

Continue on to the next paragraph

Write Introduction

Write Conclusion

I understand this method. I do not need more prompting to write the body of the paper.

If user selects "Continue on to the next paragraph, then Text Box appears stating:

"Click OK when your cursor is where you want it"

User clicks "OK"

Text Box appears stating:

"Look at the quote or piece of information. You need to introduce this information. What is the main point that you are trying to make about this piece of information?"

(Space is left for the user to type up to three hundred characters)

"When you are finished, click OK"

User clicks "OK"

Information user typed into Text Box is selected. Control-X is performed. Control-V is performed and the information is pasted in front of the last cursor position, leaving two spaces before the cursor position.

And so on . . .

If user clicks "I understand this method. I do not need more prompting to write the body of the paper."

Text Box appears stating:

"Click on the Finish Button when you are ready to write your introduction and conclusion"

User clicks "OK"

User selects "Finish" from control bar

Finish Drop Menu activated with following options:

Compose Introduction

Compose Conclusion

Compose Works Cited Page

Compose Title Page

Compose Dedication Page

Compose Table of Contents

Final Spacing

Check Header/Footer

User selects "Compose Introduction"

Text Box appears stating:

I hate writing introductions. Show me an example.

Walk me through the introduction.

User selects "I hate writing introductions. Show me an example."

"Next" button is selected

Text Box appears stating:

"The last step in the actual writing process is to write the introduction and conclusion. This is the most difficult part because it will be the first and last thing that the grader will see. Therefore, you want to start and end well. The basic format for the inverted pyramid is as follows:

(1) Global statement: The history of the United States, and indeed, the world, was changed by Abraham Lincoln's presidency.
    (2) Narrower statement: Were it not for the Civil War and the eventual victory of the North, the United States as we know it would not exist.

(3) Narrower statement: Abraham Lincoln orchestrated one whole side of the Civil War.
(4) Narrower statement: Because of this, it is important to examine Abraham Lincoln as a person, in order to better understand all of American history.
(5) Narrower statement: Specifically, Lincoln's parents played a large part in shaping Lincoln's character.
(6) Thesis Statement: Therefore, Lincoln's character, as partially formed by his parents, changed the course of U.S. history by allowing Lincoln the courage to write the Emancipation Proclamation.

I am ready to write the introduction on my own.
Show me other kinds of introductions
Help me write the introduction
User selects "Show me other kinds of introductions"
"Next" is selected
Text Box appears stating:
"There are several basic formats for the introduction. The most popular is the inverted pyramid, which goes as follows:
(1) Make a global statement that is really huge. This is not your main point; it is a general truth.
(2) Narrow the statement down until you reach your main thesis. This is something that can be proven in a short paper rather than a book.
Other Introductions
Some instructors will prefer if you place all of your main points in the introduction. If so, you have already made all of your main points in the body of the paper. Similarly, the thesis statement will be either the first or the last sentence of the introduction. If you are unsure, ask your instructor what is required.
User selects "OK"
Text Box appears stating:
I hate writing introductions. Show me an example.
Walk me through the introduction.
User selects "Walk me through the introduction"
"Next" button is selected
Text Box appears stating:
Inverted Pyramid format
Other format
User selects "Inverted Pyramid format"
"Next" Button is selected
Text Box appears:
Space is provided after each prompt, allowing the user up to five hundred characters to respond
"Look at the bigger picture. Make a global statement:"
"Narrow this statement down. You want to get a bit closer to your thesis statement:"
"Narrow this down even further:"
"Any more narrowing to do?"
"Thesis Statement:"
User selects "OK"
Control-X is performed on all of the information the user has written
Control-V is performed, pasting all of the information, each sentence placed in the order in which it was typed, with two spaces between each sentence.
Text Box appears stating:
"Do you wish to edit the introduction?
Yes
No
User selects "Yes"
Text Box appears in lower right corner of screen stating:
Click OK when you have finished
User clicks "OK"
Text Box appears stating:
"Do you wish to edit the introduction?

Yes
No
User selects "No"
User clicks "Finish" on task bar
Finish Menu appears
User selects "Compose Conclusion"
Text Box appears stating:
This is a tricky part of the paper. Each teacher tends to expect something different from the conclusion. However, there are tried-and-true basic formats.
(1) Tell them what you already told them in the paper. Some teachers expect you to make your points as you go through the paper. At the end, the instructor simply wants a restatement of your major points. It will then be expected that either the first or the last sentence of the conclusion will be your thesis statement.
(2) "Open up" your thesis. Restate your thesis and then discuss the implications of your thesis. Expand the idea into other areas and give the reader something more to think about. In other words, tell the reader what it all means and what other conclusions it might lead to.
(3) Say what you think. If the instructor specifically requests it, put your opinion into the paper. This is one of the rare times that it may be good to use the word "I."
Hint, Try using the Conclusions button. It can help you get started on your thoughts.
User selects Finish Button
Finish Button Drop Menu Activated
User selects Compose Works Cited Page(s)
Text Box appears stating:
"The Works Cited page can be composed for you from the information you already entered for the sources. This page will be in the proper format (MLA, APA, Chicago) that you have already selected, following all spacing and punctuation rules, as well as being alphabetically listed. Select each that is appropriate:
Compose Works Cited Page
Add Works Cited Page after last page of text
Add page number to Works Cited Page
All circles are selected as a default
User clicks "Next"
Works cited page is composed with all the bibliographic information already entered under Sources.
The first letter of each citation is analyzed and put in alphabetical order.
The page is pasted at the end of the paper and the correct page number is added.
Text Box appears stating:
"What do you want to do next?"
Compose Title Page
Compose Dedication Page
Compose Table of Contents
Final Spacing
Check Header/Footer
User selects "Compose Title Page"
"Next" is selected.
Text Box appears stating:
"Do you want a Title Page or does your instructor prefer that you list the information on the first page of text"
Title Page
First Page of text
If either is selected, the Program will enter the information on the Title Page or first page of text that the user already entered when beginning the paper. If any information is missing:

Text Box appears stating:

"You have not entered all the necessary information, please fill out any field that is blank or incomplete. (User is provided with up to two hundred characters per field to fill out the required information)

Click OK when finished.
User clicks "OK"
Text Box appears stating:
"What do you want to do next?"
Compose Dedication Page
Compose Table of Contents
Final Spacing
Check Header/Footer
User selects "Compose Dedication Page"
"Next" is selected.
Text Box appears stating:
"The Dedication Page is not generally necessary; however, it is a chance for you to dedicate all of your hard work to virtually anything you like. The page appears either directly after the Title Page (if you have one) or directly after the text, but before the Works Cited Page(s).
Add Dedication Page?
Yes
No
User selects "Yes"
"Next" Button is selected
Text Box appears stating:
"What would you like to say in your dedication? Hint, these pages usually begin with "This work/paper is dedicated to . . ."
User is left with up to two thousand character to respond.
User selects "OK"
Program cuts and pastes dedication to either a separate page (if there is a title page) or just before the works cited page
Text Box appears stating:
"What do you want to do next?"
Compose Table of Contents
Final Spacing
Check Header/Footer
User selects "Compose Table of Contents"
"Next" is selected.
Text Box appears stating:
"What do you want to do next?"
Final Spacing
Check Header/Footer
User selects "Final Spacing"
"Next" is selected.
Entirety of the document is automatically formatted to included the following:
Anything in quote marks that exceed four lines have the quote marks deleted, are indented ten spaces. These quotes will add extra spaces at the bottom of the current page, if necessary, so that the quote is not separated at the end of a page. These extra spaces will position the long quote to appear on the first line of the next page.
Entire document is double spaced
Text Box appears stating:
"What do you want to do next?"
Check Header/Footer
User selects "Check Header Footer"
"Next" is selected.
Header is opened by the program.
Text Box appears in lower right corner of screen stating:
"Click OK when you have finished creating/editing header"
User clicks "OK"
Footer is opened by the program.
Text Box appears in lower right corner of screen stating:
"Click OK when you have finished creating/editing footer"
User clicks "OK"
Text Box appears stating:
"What do you want to do next?"
Go on to Spelling and Grammar Check
Circle is filled
"Next" button is selected
(This same function happens when user selects "Spelling and Grammar" Button)
Drop Menu for Spelling and Grammar activated:
Menu Drops with the following options:
Check Normal Spelling and Grammar Check
Check Everything
Check Tense
Check Diction and Prepositions
Check Misused/Mistyped Words
If user selects "Normal Spelling and Grammar Check" Word Processing program will go into its normal spelling and grammar check function
If user selects any of the other functions from the drop menu
Text Box appears stating:
"This program will check for many different forms of writing errors, including basic spelling and grammar mistakes. This means that the program will check for many of the little things for which graders normally deduct points. Click OK to continue.
User clicks "OK"
If user selects Tense:
Program checks all verbs from a list of all verbs contained in Dictionary Program in Word, WordPerfect and other word processing programs. Each verb will be in the tense specified by the paper type. For example: all history papers must be written entirely in the past tense. Any verbs that are contained within quotation marks (within 300 characters), provided that the quote marks are both beginning and ending, will be excluded from this function. Similarly, all verbs in a literary paper will be in the present tense.
If user selects Diction and Prepositions:
Program will automatically check all diction and preposition errors from the contained list of diction and preposition errors already listed. Should the proper preposition not appear within 100 characters of the word that has a particular preposition attached to it, the word is highlighted and the user is prompted to select the correct usage or ignore the item.
If the user selects "Check Misused/Mistyped Words"
Program will automatically check all misused or mistyped words from the contained list of misused and mistyped words list. Should the program detect any words that are frequently misused or mistyped, the spelling and grammar check will highlight the word and ask the user to change usage or ignore.
For example:
Text Box appears stating:
"The program has detected the following possible error:"
You used the word palette which means "a painting surface"
Program then suggests alternative meanings
really mean:
Pallid—Pale
Pallet—a surface used to stack items for transport, usually by a forklift or skid loader
Palate—Of or pertaining to the mouth; the roof of the mouth; one's sense of taste
I already know this. Do not remind me of this again.

Buttons on right side of text box: Ignore Once, Replace, Next
    User selects Palate
    User selects "Replace"
    Program copies "palate" from text box and pastes into the document.
    Program searches for next error.
    If user selects "Print"
    Text Box appears stating:
    "It is a good idea to print the document so you can make sure that your printer is working correctly. It may also help if you see the paper in the format in which your grader will see it. *REMEMBER* There is absolutely no substitute for a good proofreader. This program attempts to correct many of the common mistakes that writers make, but it is impossible to catch and/or correct everything. Get a good writer to proofread your paper to make sure it is exactly what you want to submit."

Appendix H—Other Paper Type Walkthrough Examples
    Text box appears asking:
    "What type of paper?"
    History
    Literature
    Creative
    Other
    "Literature" is selected
    "Next" button is selected
    Text Box refreshes
    "What specific category of paper?"
    Informative
    Persuasive
    Compare and Contrast
    Other
    "Persuasive" is selected
    "Next" Button is selected
    Text Box appears stating:
    "All Literature papers must be written in the present tense, unless you are referring to something that happened earlier or later in the text than the point to which you are currently referring, or if the information appears in quote marks. This program will underline anything not in the present tense as you write the paper. It will also prompt you to select another tense when you perform your Spelling and Grammar check. Click Next to continue"
    I already know this. Do not remind me again.
    User fills circle before selecting "Next"
    For this user, program will not display this information again.
    User clicks "Next"
    Text Box appears stating:
    "In a persuasive paper, you are not simply informing the reader of what has happened with respect to a particular person or issue. You are trying to persuade the user that your position is the best position. Because of this, you are required to have an opinion. However, this does not mean that it is necessarily appropriate to use the words "I" or "you." Check with your grader to determine if the use of these words is appropriate. For example, some graders will allow you to use these terms only in the conclusion."
    I already know this. Do not remind me again.
    "Next" button is selected.
    Program automatically sets limitations. All verbs not in the present tense will automatically be underlined.

If user selects "Compare and Contrast"
    Text Box appears stating:
    "There are several forms that the Compare and Contrast paper can take. Please select the format that you or your grader prefers:"
    (1) Option A: Introduction, describe the entirety of one side, then describe the entirety of the other, followed by all comparisons, and then all contrasts and a conclusion. The program will lay out this format with titles saying:
    Introduction
    Describe all of one side
    Describe all of the other side
    All comparisons
    All contrasts
    Conclusion
    Each of these headlines will be followed by ten lines of space, in which the user will paste his or her quotes.
    (2) Option B: Introduction, brief description of A and B, followed by point 1: compare A to B, then contrast A to B; point 2: compare A to B, etc. The program will lay out this format with titles saying:
    Introduction
    Brief description of first side and second side
    Comparison of point 1
    Contrast of point 1
    Comparison of point 2
    Contrast of point 2
    Conclusion
    The user will select how many points he or she wishes to use, which will determine the amount of points to be explored before writing the conclusion. Each of the headlines will be followed by ten lines of space, in which the user will paste his or her quotes.
    I will use my own format
    User fills circle for option A
    "Next" is selected
    Text Box appears stating:
    "Select the number of points you wish to make. If you are unsure, you will automatically be set up with three major points"
    Number of points: (Space provided for user to select up to 20 points)
    User types in "4"
    "Next" is selected
    Paper is automatically formatted in the following fashion:
    Introduction
    Describe all of one side
    Describe all of the other side
    All comparisons
    Point 1
    Point 2
    Point 3
    Point 4
    All contrasts
    Point 1
    Point 2
    Point 3
    Point 4
    Conclusion
    Each of these headlines will be followed by ten lines of space, in which the user will paste his or her quotes or pieces of information.
    If user selects "Option B" the document will be automatically formatted in the following fashion:
    Introduction
    Brief description of first side
    Brief description of second side Comparison of point 1
Contrast of point 1
Comparison of point 2
Contrast of point 2
Comparison of point 3
Contrast of point 3
Comparison of point 4
Contrast of point 4
Conclusion

What is claimed is:

1. A method of providing document specific instructions during a document's composition, the method executing on a computer system, the method comprising:
    obtaining, at the computer system, a document type indication of a document;
    providing an interface element to select one of a plurality of document sub-types, including at least three of an document informative sub-type, a persuasive sub-type, a compare and contrast sub-type, and a creative sub-type;
    obtaining, at the computer system, a document sub-type selection in accordance with said interface element;
    providing a document specific preparation guide in accordance with said document type indication and said document sub-type selection;
    providing a document specific documentation guide in accordance with said document type indication and said document sub-type selection;
    providing a document specific grammar guide in accordance with said document type indication and said document sub-type selection;
    obtaining, at the computer system, a user response to at least one of said provided guides;
    modifying said document in accordance with said user response;
    obtaining, at the computer system, a citation format type indication of the document;
    storing in a memory of the computer system a plurality of structured bibliographic sources;
    obtaining, at the computer system, a selection of at least one from said plurality of bibliographic sources;
    obtaining, at the computer system, a location reference within said selected bibliographic source; and
    using a processor, inserting into the document, in accordance with said citation format type indication, a citation associated with said selected bibliographic source and said location reference.

2. The method of claim 1, wherein said preparation guide comprises research instructions.

3. The method of claim 2, wherein said research instructions comprise a research checklist.

4. A computing apparatus including the processor and the memory having computer-executable instruction for performing the method of claim 1.

5. A computer-readable medium including computer-executable instruction for performing the method of claim 1.

6. The method of claim 1 wherein each structured bibliographic source comprises at least one of author, publication, and publication date.

7. The method of claim 1 wherein the citation format type indication comprises at least one of a citation format, a margin, a footnote indication, a cover page indication, and a header.

8. The method of claim 1 wherein the method of formatting citations comprises the further steps of:
    obtaining, at the computer system, a second format type indication of a document; and
    using the processor, reinserting at least one of said citations in accordance with said second format type indication.

9. The method of claim 1 wherein the location reference is a page number.

10. The method of claim 1 wherein the location reference is a paragraph number.

11. The method of claim 1 wherein the said insertion is at a current cursor position in the document.

12. The method of claim 1 wherein the document comprises a bibliography and said inserting into the document comprises inserting said citation into said bibliography.

* * * * *